United States Patent
Schmid et al.

(10) Patent No.: US 8,794,067 B2
(45) Date of Patent: Aug. 5, 2014

(54) DOUBLE-AXIS ROTATION RATE SENSOR

(75) Inventors: Bernhard Schmid, Friedberg (DE);
Stefan Günthner, Frankfurt (DE);
Ramnath Sivaraman, Frankfurt (DE)

(73) Assignee: Continental Teves AG & Co. oHG (DE)

( * ) Notice: Subject to any disclaimer, the term of this patent is extended or adjusted under 35 U.S.C. 154(b) by 331 days.

(21) Appl. No.: 13/255,321

(22) PCT Filed: Mar. 11, 2010

(86) PCT No.: PCT/EP2010/053145
§ 371 (c)(1), (2), (4) Date: Nov. 17, 2011

(87) PCT Pub. No.: WO2010/103093
PCT Pub. Date: Sep. 16, 2010

(65) Prior Publication Data
US 2012/0048016 A1    Mar. 1, 2012

(30) Foreign Application Priority Data
Mar. 11, 2009 (DE) .................. 10 2009 012 269

(51) Int. Cl.
*G01C 19/56* (2012.01)

(52) U.S. Cl.
USPC ...................................................... 73/504.12

(58) Field of Classification Search
USPC .......................... 73/504.12, 504.14
See application file for complete search history.

(56) References Cited

U.S. PATENT DOCUMENTS

| 7,444,868 | B2 * | 11/2008 | Johnson ............ 73/504.12 |
| 2004/0206176 | A1 | 10/2004 | Willig |
| 2008/0257042 | A1 | 10/2008 | Tateyama |
| 2008/0282833 | A1 | 11/2008 | Chaumet |
| 2010/0037690 | A1 | 2/2010 | Gunthner |
| 2010/0116050 | A1 | 5/2010 | Wolfram |

FOREIGN PATENT DOCUMENTS

| DE | 10237411 A1 | 7/2003 |
| DE | 102007012163 A1 | 10/2007 |
| DE | 102007030119 A1 | 1/2009 |
| WO | 03058167 A1 | 7/2003 |

OTHER PUBLICATIONS

Kawai, H. et al., "High-Resolution Microgyroscope Using Vibratory Motion Adjustment Technology," Sensors and Actuators A, Elsevier Sequoia S.A., Lausanne, vol. A90, No. 1/02, May 1, 2001, pp. 153-159.
German Search Report issued in related Application No. DE 10 2010 002 796.0 dated Jan. 19, 2011 (with partial English translation).
International Search Report issued in PCT/EP2010/053145 filed Mar. 11, 2010, mailed Jun. 29, 2010.

* cited by examiner

*Primary Examiner* — John Chapman, Jr.
(74) *Attorney, Agent, or Firm* — RatnerPrestia

(57) ABSTRACT

A micromechanical rotation rate sensor, comprising at least one substrate, wherein the rotation rate sensor has at least a first and a second seismic mass which are coupled to one another by means of at least one coupling beam, and wherein the rotation rate sensor is embodied in such a way that it can detect rotation rates about at least a first and a second sensitive axis, wherein each seismic mass is assigned at least one actuator unit with which the deflection behavior of the seismic mass can be influenced.

13 Claims, 27 Drawing Sheets

Sensor element composed
of wafer substrate

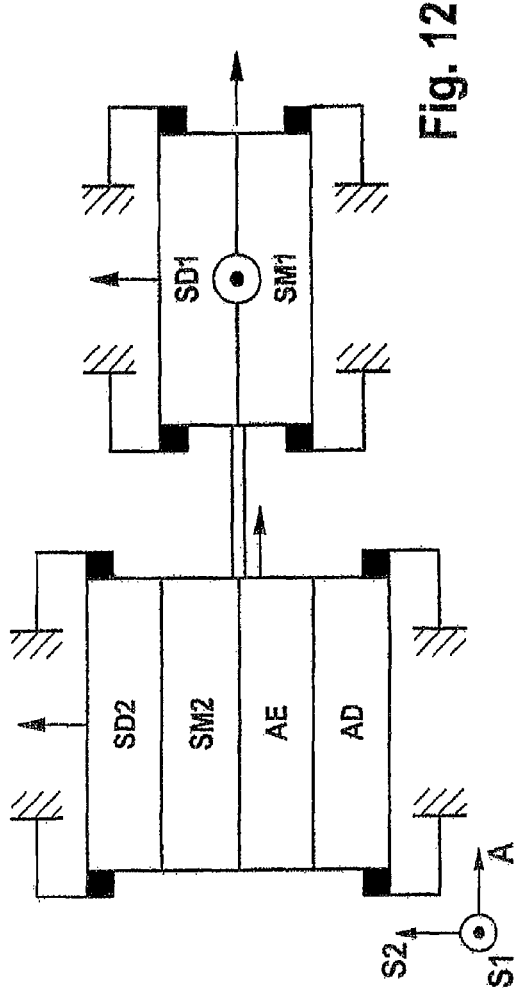
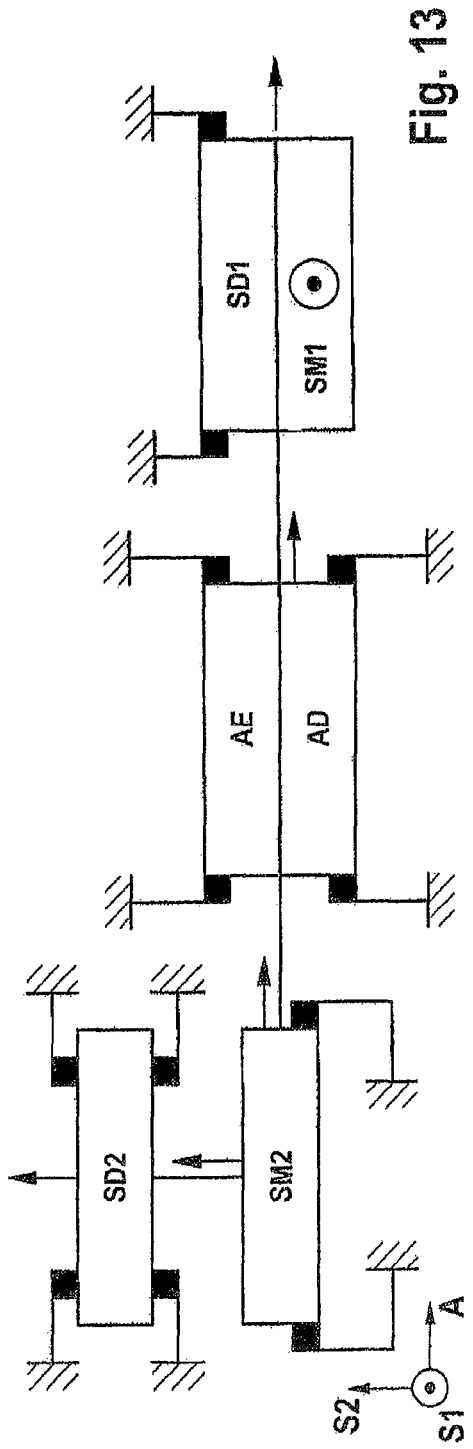

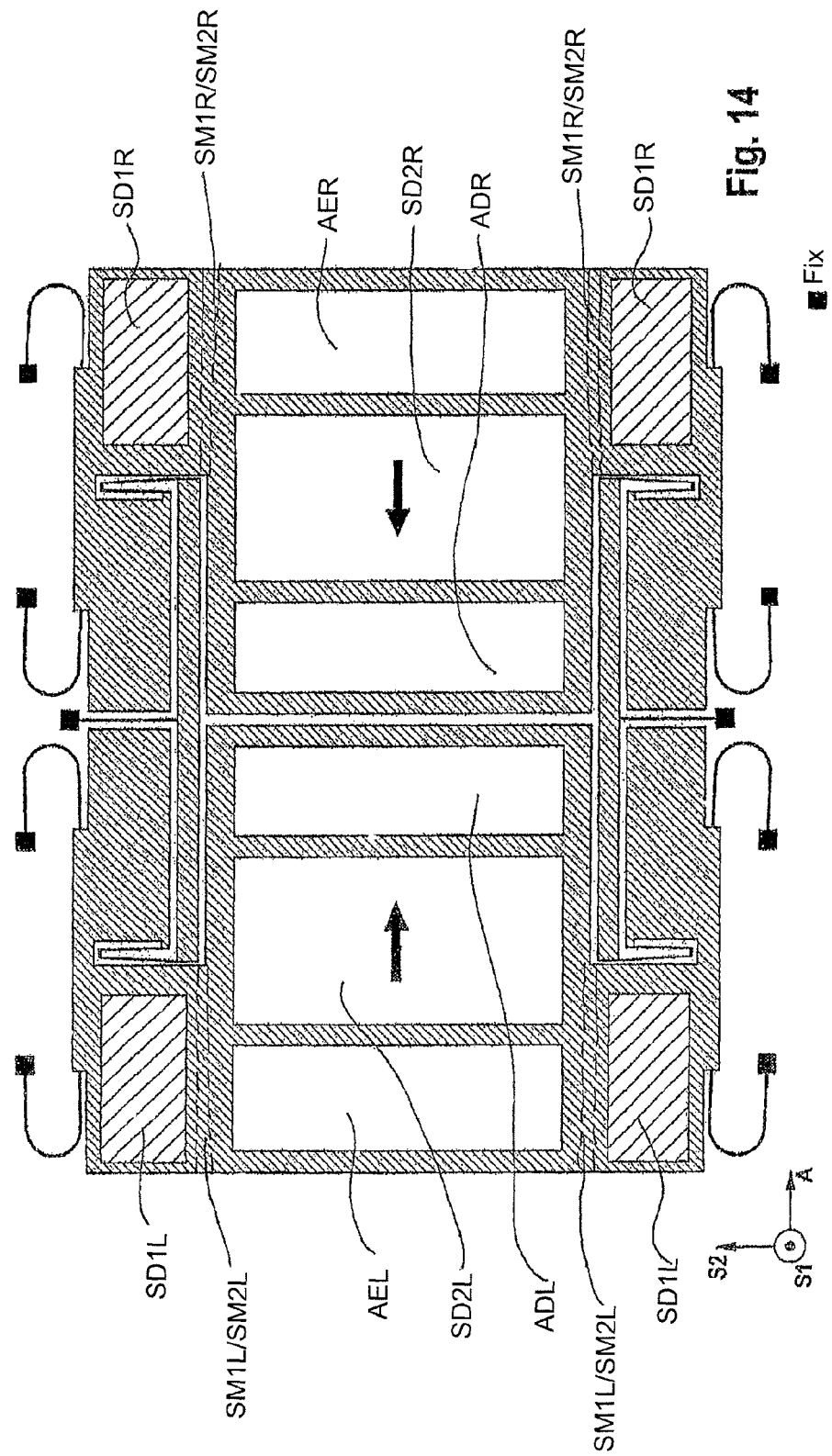

DOUBLE-AXIS ROTATION RATE SENSOR

CROSS REFERENCE TO RELATED APPLICATIONS

This application is the U.S. National Phase Application of PCT International Application No. PCT/EP2010/053145, filed Mar. 11, 2010, which claims priority to German Patent Application No. 10 2009 012 269.9, filed Mar. 11, 2009, the contents of such applications being incorporated by reference herein.

FIELD OF THE INVENTION

The invention relates to a a micromechanical rotation rate sensor, comprising at least one substrate, wherein the rotation rate sensor has at least a first and a second seismic mass which are coupled to one another by means of at least one coupling beam, and wherein the rotation rate sensor is embodied in such a way that it can detect rotation rates about at least a first and a second sensitive axis, wherein each seismic mass is assigned at least one actuator unit with which the deflection behavior of the seismic mass can be influenced.

BACKGROUND OF THE INVENTION

For example in driving stability control systems (ESP) for controlling and limiting undesired yaw movements of a motor vehicle about its vertical axis, significant variables which can be changed at will by the driver are measured using sensors. The variables which can be changed by the driver include the steering angle, the accelerator pedal position, the brake pressure, the lateral acceleration of the vehicle and the rotational speed of the individual vehicle wheels. A setpoint yaw rate is calculated from the measured variables. At the same time, the actual value of the yaw rate, which occurs in reaction to the driving maneuver, is measured with a yaw rate sensor. If the actual value of the yaw rate differs from the calculated setpoint value of the yaw rate beyond a predetermined degree at which the driving stability is endangered, the yaw movement of the vehicle and therefore the actual yaw rate are limited to permissible values by selective intervention in the brakes and the engine. In addition to the driving stability control systems, vehicle occupant protection devices serve to increase the safety of the vehicle occupants in a motor vehicle. A considerable number of accidents involve only one motor vehicle. Fatal, injuries usually occur in this type of accident if the motor vehicle rolls over about its longitudinal axis during the accident. In particular in the case of convertibles, rolling over of the vehicle can have fatal consequences. For this reason, vehicle occupant protection devices for convertibles are known which ensure a survival space for the vehicle occupants so that they do not come directly into contact with the underlying surface in the event of a rollover. A rollover bar, which extends over the heads of the vehicle occupants, meets this purpose. However, in the case of convertibles the esthetic impression is adversely affected to a considerable degree by a fixed rollover bar. For this reason, in a number of convertibles protection devices are provided which in a normal situation are concealed in the vehicle seats or behind the vehicle seats and are not extended, and then carry out their protective function, until a rollover is imminent. Prompt triggering of such a protection device requires prompt detection of an imminent rollover process. In inter-vehicle distance control systems, the pitching rate is additionally used, for example, for orienting the measurement beam (radar, infrared or the like) or else for controlling lighting systems. FIG. 1 contains a definition of the yaw rate, rolling rate and pitching rate. With respect to the plane in which the wheels of the vehicle lie, the yaw axis corresponds to the z direction of this plane in Cartesian coordinates.

SUMMARY OF THE INVENTION

The invention proposes a rotation rate sensor which permits more precise and/or more robust detection of rotation rates about at least two sensitive axes and/or a relatively compact design of the rotation rate sensor.

This is achieved according to aspects of the invention by means of, a micromechanical rotation rate sensor, comprising at least one substrate, wherein the rotation rate sensor has at least a first and a second seismic mass which are coupled to one another by means of at least one coupling beam, and wherein the rotation rate sensor is embodied in such a way that it can detect rotation rates about at least a first and a second sensitive axis, wherein each seismic mass is assigned at least one actuator unit with which the deflection behavior of the seismic mass can be influenced.

The base surface of the substrate of the rotation rate sensor is preferably oriented parallel to the x-y plane of a Cartesian coordinate system. The first and second sensitive axes are arranged, in particular, essentially at a right angle to one another.

The driving direction of the first and second seismic masses is preferably essentially at a right angle both to the first and to the second sensitive axis.

The at least one actuator unit preferably has at least an electrode structure or a comb structure and is configured and can be actuated in such a way that an electrical actuator voltage is present between the electrode structure or comb structure of the actuator unit and the seismic mass assigned thereto, or the part of the electrode structure or the comb structure and the seismic mass, which actuator voltage gives rise to an electrical force with which the deflection behavior of the seismic mass can be influenced.

The rotation rate sensor preferably has at least one actuator unit which is embodied as a quadrature trimming actuator unit, and at least one quadrature trimming control unit which sets at least one electronic actuator voltage in such a way that parasitic oscillation components of at least the first and the second seismic masses and/or a quadrature signal are suppressed.

It is preferred that the rotation rate sensor has at least one actuator unit which is embodied as a resetting actuator unit, and the rotation rate sensor has a resetting control unit which sets at least one electrical actuator voltage in such a way that the reading out deflections and/or reading out oscillations are reset, in particular continuously, with respect to the first and/or second sensitive axes.

It is expedient that the rotation rate sensor has at least one actuator unit which is embodied as a combined quadrature trimming resetting actuator unit, and the rotation rate sensor has a quadrature trimming resetting control unit which sets at least one electrical actuator voltage in such a way that the reading out deflections and/or reading out oscillations are reset, in particular continuously, with respect to the first and/or second sensitive axes of the rotation rate sensor, and that parasitic oscillation components of at least the first and second seismic masses and/or a quadrature signal are suppressed. The quadrature trimming resetting control unit is, in particular, preferably embodied in such a way that it sets or adjusts a direct voltage component for the quadrature trimming as well as an alternating voltage component for resetting as an actuator voltage.

It is preferred that the rotation rate sensor respectively comprises at least a first, a second and a third oscillator configuration with respect to the deflection of the first and second seismic masses, wherein the first oscillator configuration has at least one drive unit which imposes a driving oscillation on said first oscillator configuration, which driving oscillation comprises deflections of the seismic mass in the direction of a first axis, wherein the first oscillator configuration has a defined driving resonant frequency or driving frequency, the second oscillator configuration is defined essentially by means of the deflections of the seismic mass in the direction of a second axis in the form of a first reading out oscillation, which oscillation is caused by the effect and/or detection of a rotational rate about the first sensitive axis, wherein the second oscillator configuration has a defined first reading out resonant frequency, the third oscillator configuration is defined essentially by means of the deflection of the seismic mass in the direction of a third axis in the form of a second reading out oscillation which is caused by the effect and/or detection of a rotation rate about the first second sensitive axis, wherein the third oscillator configuration has a defined second reading out resonant frequency.

The rotation rate sensor preferably comprises at least one drive unit for driving at least the first and second seismic masses for the driving oscillation, wherein this drive unit is configured in such a way that it drives the first and second seismic masses in opposite phases, that is to say phase-shifted with respect to the driving oscillation by essentially 180° in relation to one another. As a result, the center of gravity of the entire rotation rate sensor remains essentially at rest with respect to the driving oscillation.

The at least one drive unit preferably comprises a drive control unit and a drive detection unit which detects the deflection of the assigned at least one seismic mass and makes this information available, in particular to the drive control unit.

It is preferred that the rotation rate sensor has at least one actuator unit which is embodied as a resonant frequency shift actuator unit, and the rotation rate sensor has a resonant frequency shift control unit which sets at least one electrical actuator voltage in such a way that the driving resonant frequency and/or the first reading out resonant frequency and/or two resonant frequencies, of the corresponding oscillator configuration or configurations are changed by a defined value and/or are set to a defined value.

The rotation rate sensor preferably has, per seismic mass, a resonant frequency shifting actuator unit which is assigned to this seismic mass and/or a quadrature trimming actuator unit and/or resetting actuator unit and/or combined quadrature trimming resetting actuator unit.

The at least one coupling beam is preferably suspended from at least one spring element, in particular a torsion spring element. In this context, this at least one spring element is particularly preferably clamped onto the substrate and forms an anchoring point therewith. It is expedient that at least this one spring element is embodied and clamped in or attached in such a way that it prevents translatory deflections of the coupling beam.

The at least one coupling beam is preferably suspended, essentially in the region of its central gravity, from the at least one spring element.

The at least one coupling beam is expediently connected or coupled at its ends to the seismic masses, by means of spring elements in each case. In particular, it is connected at its first end to the first seismic mass and at its second end to the second seismic mass.

The at least one coupling beam is preferably configured and arranged in such a way that it suppresses undesired oscillations and deflections, in particular common, particularly preferably common-phase or rectified and identically oriented translatory deflections of the first and second seismic mass, in terms of the first and/or second reading out oscillation.

The at least one electrode structure preferably has, in particular in each case, at least one electrode which is particularly preferably embodied as a capacitor plate which is embodied essentially parallel to the base surface of the substrate of the rotation rate sensor.

The at least one comb structure preferably has, in particular in each case, comb backs and prongs which are formed in the substrate and whose comb back prong geometry is constructed at least in the plane of the substrate. The prongs of the comb structure, and their respective prong side outer face or faces, forms/form particularly preferably electrodes whose normals are oriented perpendicularly to the normal to the plane of the substrate.

At least the first and second seismic masses, and in particular further units of the rotation rate sensor, are preferably connected to the substrate and/or to one another by means of spring elements which are embodied in a U shape or V shape or S shape. These spring elements have, in particular, in each case two spring beam elements which are oriented essentially parallel to one another in the non-deflected state and which can particularly preferably be deflected relative to one another in the direction of these spring beam elements.

A quadrature trimming unit and/or resetting unit and/or frequency shifting unit and/or drive control unit preferably comprises a power supply unit for providing electrical energy or electrical voltage to the at least one assigned comb structure and/or electrode structure as well as, in particular, an electronic control unit which makes this electrical voltage available in accordance with a defined setting algorithm and/or control algorithm and calculates and/or adjusts the electrical voltage value which is to be respectively made available.

It is preferred that the second and third oscillator configurations are embodied and/or operated in such a way that the difference between the first reading out resonant frequency and the driving resonant frequency and the difference between the second reading out resonant frequency and the driving resonant frequency are both greater than zero or both smaller than zero, wherein, in particular, the absolute value of the difference between the first reading out resonant frequency and the second reading out resonant frequency is greater than 0.1 Hz, in particular greater than 1 Hz, particularly preferably greater than 10 Hz and quite particularly preferably greater than 50 Hz.

It is expedient that the second and third oscillator configurations are embodied and/or operated in such a way that the difference between the first reading out resonant frequency and the driving resonant frequency is greater than zero and the difference between the second reading out resonant frequency and the driving resonant frequency is smaller than zero or vice versa, wherein, in particular, the absolute value of the difference between the first reading out resonant frequency and the second reading out resonant frequency is greater than 0.1 Hz, in particular greater than 1 Hz, particularly preferably greater than 10 Hz, and quite particularly preferably greater than 50 Hz.

It is preferred that the second and third oscillator configurations are embodied and/or operated in such a way that the difference between the first reading out resonant frequency and the driving resonant frequency is essentially equal to zero or the difference between the second reading out resonant frequency and the driving resonant frequency is essentially equal to zero, or that the difference between the first reading out resonant frequency and the driving resonant frequency and the difference between the second reading out resonant frequency and the driving resonant frequency are respectively essentially equal to zero.

The fact that the difference between a reading out resonant frequency and the driving resonant frequency is essentially equal to zero is preferably understood to mean that this difference is smaller than 10 Hz, in particular smaller than 1 Hz, and particularly preferably smaller than 0.1 Hz.

A relatively large value is preferably selected for the distance between the first and second reading out resonant frequencies, that is to say the absolute value of the difference between the second reading out resonant frequency and the first reading out resonant frequency, in order to avoid crosstalk between the two reading out oscillations and to be as insensitive as possible to external interference, in terms of interference variables with frequencies in the range of this difference frequency, and the absolute value of this difference is therefore, in particular, greater than 0.1 Hz, particularly preferably greater than 1 Hz, quite particularly preferably greater than 10 Hz, and in particular quite particularly preferably greater than 50 Hz.

It is preferred that the rotation rate sensor comprises at least one drive unit and at least a first and a second detection unit with respect to at least the first seismic mass, in particular every seismic mass, wherein this drive unit and/or the first and/or the second detection units are/is connected to the seismic mass via at least one spring element and, in particular, are not rigidly coupled to the seismic mass.

The first and/or second seismic masses are alternatively preferably coupled to the drive unit assigned thereto and/or to the first and/or second detection unit assigned thereto, at least partially in an essentially rigid fashion.

It is expedient that the first and second seismic masses are each connected or coupled, at least in a partially rigid fashion, to the drive unit assigned thereto and to the first and second detection units assigned thereto.

It is preferred that the first and second seismic masses each comprise a basic mass and at least one additional rotation-rate-sensitive component mass, wherein, in particular, the basic mass is part of the second oscillator configuration and is excited to undergo the first reading out oscillation when a rotation rate acts about the first sensitive axis, wherein, in particular, the additional rotation-rate-sensitive component mass also oscillates here, but is not excited in the direction of the third axis, wherein this component mass is part of the third oscillator configuration, and when a rotation rate acts about the second sensitive axis said component mass is excited to undergo the second reading out oscillation which is not followed by the respective basic mass. The rotation-rate-sensitive component mass is coupled to the basic mass by means of a spring element, wherein this spring coupling is embodied, in particular exclusively, so as to be essentially rigid in the driving direction. The respective basic mass is at least partially rigidly connected in each case to the drive unit assigned thereto, and to the first detection unit assigned thereto. The rotation-rate-sensitive component mass is, on the other hand, at least partially rigidly connected only to the second detection unit assigned thereto, and is at least partially decoupled from the drive unit and the first detection unit via the at least one spring element between the basic mass and the component mass.

It is expedient that the first and second seismic masses each comprise a basic mass and at least one additional rotation-rate-sensitive component mass, wherein, in particular, the basic mass is part of the second oscillator configuration, and is excited to undergo the first reading out oscillation when a rotation rate acts about the first sensitive axis, wherein, in particular, the additional rotation-rate-sensitive component mass also oscillates here, but is not excited in the direction of the third axis, wherein this component mass is part of the third oscillator configuration, and when a rotation rate acts about the second sensitive axis said component mass is excited to undergo the second reading out oscillation which is not followed by the respective basic mass. The rotation-rate-sensitive component mass is coupled to the drive unit by means of a spring element, wherein this spring coupling is embodied, in particular exclusively, so as to be essentially rigid in the driving direction. The basic mass is likewise coupled to the drive unit with an additional spring element in an essentially rigid fashion in the output direction, in particular exclusively in the driving direction. The respective basic mass is coupled to the first detection unit assigned thereto, via an additional spring element in such a way that this detection unit can, in particular, be deflected essentially only in the direction of the second axis, that is to say within the scope of a first reading out oscillation at least. The rotation-rate-sensitive component mass is, on the other hand, at least partially rigidly connected to the second detection unit assigned thereto, in particular exclusively, and is coupled to the other unit only via spring elements.

In this context, each of these above units preferably comprises a part which is coupled or rigidly connected to the corresponding seismic mass, as well as a part which is contactless with respect to the latter and is, in particular, coupled and/or rigidly connected to the substrate.

The drive unit and/or the first and/or the second detection unit are expediently at least partly part of the first and/or second seismic mass with respect to the first and/or second and/or third oscillator configuration.

It is preferred that the first and second seismic masses each have at least a first rotation-rate-sensitive component mass which is connected, by at least one spring element, in particular by at least one torsion spring element, to at least one other component unit of the respective seismic mass, wherein this first rotation-rate-sensitive component mass is embodied and configured in such a way that it is part either of the second or of the third oscillator configuration.

It is expedient that the rotation rate sensor has at least a first coupling beam which is embodied and arranged in such a way that it couples the deflections of the first and second seismic masses with respect to the first reading out oscillation within the second oscillator configuration, and that the rotation rate sensor additionally has at least a second, in particular a second and a third, coupling beam, which is/are embodied and arranged in such a way that it/they couples/couple the deflections of the first and second seismic masses with respect to the second reading out oscillation within the third oscillator configuration.

It is preferred that at least one quadrature trimming actuator unit has at least one comb structure which is embodied as a quadrature trimming comb structure and which comprises at least one comb structure base element pair which is composed at least of a first and a second comb structure base element which each comprise a first and a second comb back and each comprise one or two or more prongs which are each integrally connected thereto, wherein the prongs of these first and second comb backs engage one in the other in a contactless, in particular alternating, fashion, wherein the second comb structure base element is essentially embodied and arranged in comparison with the first comb structure base element in such a way that, with respect to the geometric consideration starting from the first comb structure base element, said second comb structure base element is rotated through 180° with respect to a normal to the surface of the substrate and in particular is shifted in a translatory fashion within the plane of the substrate.

The geometric relationship between the first and the second comb structure base elements of a comb structure base element pair of the quadrature trimming comb structure is therefore expediently essentially defined as dot mirroring at or about a defined point in the plane of the substrate and optionally as an additional translatory shift in the plane of the substrate.

It is expedient that all the first comb backs, which are in particular integrally connected, are rigidly connected to the substrate or are part of the substrate, and that all the first comb backs are connected essentially to the same electrical potential.

It is preferred that all the second, in particular integrally connected, comb backs are connected rigidly, in particular integrally, to one of the seismic masses or are part of this seismic mass, and that all the second comb backs are connected essentially to the same electrical potential.

In each case all the first comb backs and in each case all the second comb backs are preferably integrally connected to one another and form a common first comb back and a common second comb back.

The quadrature trimming control unit is preferably connected in an electrically conductive fashion jointly to the first comb backs or the first common comb back and in each case jointly to the second comb backs or the second common comb back, and applies thereto the actuator voltage or sets the actuator voltage at said comb backs.

The comb structure of the quadrature trimming actuator unit preferably comprises a defined number of comb structure base elements at which in each case the first comb backs and the second comb backs are integrally connected to one another.

The quadrature trimming actuator unit preferably has a plurality of such comb structures as those described above, which are arranged spatially separate from one another.

The prongs are preferably attached essentially at a right angle to the respective comb back.

It is expedient that the two comb backs of the first and second comb structure base elements are arranged essentially parallel to one another.

The alternating engagement in one another preferably satisfies the schematic pattern of a contactless toothing.

It is expedient that at least one combined quadrature trimming resetting actuator unit comprises a combined comb structure which comprises a quadrature trimming comb structure, which comprises at least one comb structure base element pair which is composed at least of a first and a second comb structure base element which each comprise a first and a second comb back and one or two or more prongs which are each integrally connected thereto, wherein the prongs of these first and second comb backs engage one in the other in a contactless, in particular alternating, fashion, wherein the second comb structure base element is essentially embodied and arranged in comparison with the first comb structure base element in such a way that, with respect to the geometric consideration starting from the first comb structure base element, this second comb structure base element is rotated through 180° with respect to a normal to the substrate surface, and is in particular shifted in a translatory fashion within the plane of the substrate, wherein the combined comb structure additionally has a comb structure which is configured as a resetting comb structure, wherein this resetting comb structure comprises at least a comb structure base element pair which is composed at least of a first and a second comb structure base element, which each comprise a first and a second comb back and one or two or more prongs which are each integrally connected thereto, wherein the prongs of these first and second comb backs engage one in the other in a contactless, in particular alternating, fashion, wherein the second comb structure base element is essentially embodied and arranged in comparison with the first comb structure base element in such a way that, with respect to the geometric consideration starting from the first comb structure base element, this second comb structure base element is mirrored along a straight line, parallel to at least one of the first or second comb backs, and is, in particular, shifted in a translatory fashion within the plane of the substrate.

The comb structure base elements of the quadrature trimming comb structure and/or of the resetting comb structure are preferably embodied, and in particular each and all embodied, in such a way that the prongs of the first comb back each engage in the same way in the prong gaps or between the prongs of the second comb back, wherein this respective engagement of the respective at least one prong of the first comb back in the respective prong gap of the second comb back does not occur centrally in an undeflected state or a state of rest. The respective first and second comb backs with their prongs are correspondingly embodied and arranged. In each case the distance between the prongs of the first comb back, which engage in a prong gap of the second comb back, and the adjacent prongs of the second comb back of this prong gap is expediently the same for all the prong to prong gap engagement of these two comb backs. The at least one prong of the first comb back, which in each case engages in, a prong gap of the second comb back, is particularly preferably not oriented centrally here with respect to its distance from the two adjacent prongs of the second comb back of this prong gap, in each case with respect to an undeflected state or a state of rest.

It is preferred that in each case the first comb backs of the quadrature trimming comb structure and the resetting comb structure and in each case the second comb backs of the quadrature trimming comb structure and the resetting comb structure are embodied in one piece, and therefore, in particular, form a common first comb back and a common second comb back and/or are connected to the same electrical potential.

The first common comb back is preferably embodied as a common comb back with prongs protruding outward on both sides or comprises two first common comb backs which are spaced apart from one another and have prongs which have turned toward one another or project inward. The first common comb back is connected, in particular, rigidly to the substrate of the rotation rate sensor.

The second common comb back is preferably embodied as a frame with inwardly projecting prongs, in particular starting from two opposite sides of the frame, or as a common comb back with prongs which protrude outward on both sides. The second common comb back is, in particular, embodied so as to be movable with respect to the substrate and is particularly preferably connected in an at least partially rigid fashion to the first and/or second seismic masses.

Such a frame is preferably understood to be a frame geometry with a rectangular outer base surface and inner base surface.

The quadrature trimming resetting control unit is preferably respectively connected jointly to the first comb backs or the first common comb back and respectively jointly to the second comb backs or the second comb back, in an electrically conductive fashion, and applies thereto the actuator voltage or sets the actuator voltage at the latter, jointly for the purpose of trimming the quadrature or for suppressing quadrature signals and for resetting the reading out deflections and/or reading out oscillations.

The invention also relates to a method for manufacturing a micromechanical rotation rate sensor according to aspects of the invention.

The invention also relates to the use of the rotation rate sensor in a sensor control system and/or vehicle movement dynamics control system of a motor vehicle, wherein the yaw rate and rolling rate or yaw rate and pitching rate or rolling rate and pitching rate or yaw rate and rolling rate and pitching rate of the motor vehicle are detected by means of one or more of the rotation rate sensors according to aspects of the invention. This information is used to detect and control vehicle movement dynamic situations in ESP, vehicle occupant protection and comfort control systems.

BRIEF DESCRIPTION OF THE DRAWINGS

The invention is best understood from the following detailed description when read in connection with the accompanying drawings. Included in the drawings is the following figures:

Specifically.

FIG. 12 depicts a sensor in which the detection unit SD2 and the seismic mass SM2 are completely coupled to the drive unit.

FIG. 13 depicts a sensor in which the detection unit SD2 and the seismic mass SM2 are connected in a double-decoupled fashion to the drive unit.

FIG. 14 depicts an exemplary dual-axis rotation rate sensor which is constructed from two seismic masses.

DETAILED DESCRIPTION OF THE PREFERRED EMBODIMENTS

The rotation rate sensor is preferably based on the principle of a vibrating micromechanical rotation rate sensor which is composed of a system of spring elements and masses. The core is formed by a monolithic rotation rate sensor element with a degree of freedom of movement A. Here, a drive unit (AE) excites parts of the sensor structure or the entire structure (seismic mass: SM) to oscillate along this degree of freedom. The resonant frequency along the degree of freedom A or the first axis is fA. In addition, there are two further degrees of freedom of movement (S1 and S2) and/or a second and third axis in the direction of which parts of the structure or the entire structure can be deflected if the rotation rate sensor rotates about axes which are orthogonal to A, in particular in the direction of S1 and S2. The degrees of freedom of movement S1 and S2 are particularly preferably essentially orthogonal with respect to one another and orthogonal with respect to the driving direction A of the drive. A, S1 and S2 therefore form a Cartesian coordinate system (x, y and z). The resonant frequencies along the degrees of freedom S1 and S2 are fS1 and fS2.

Figure 1:
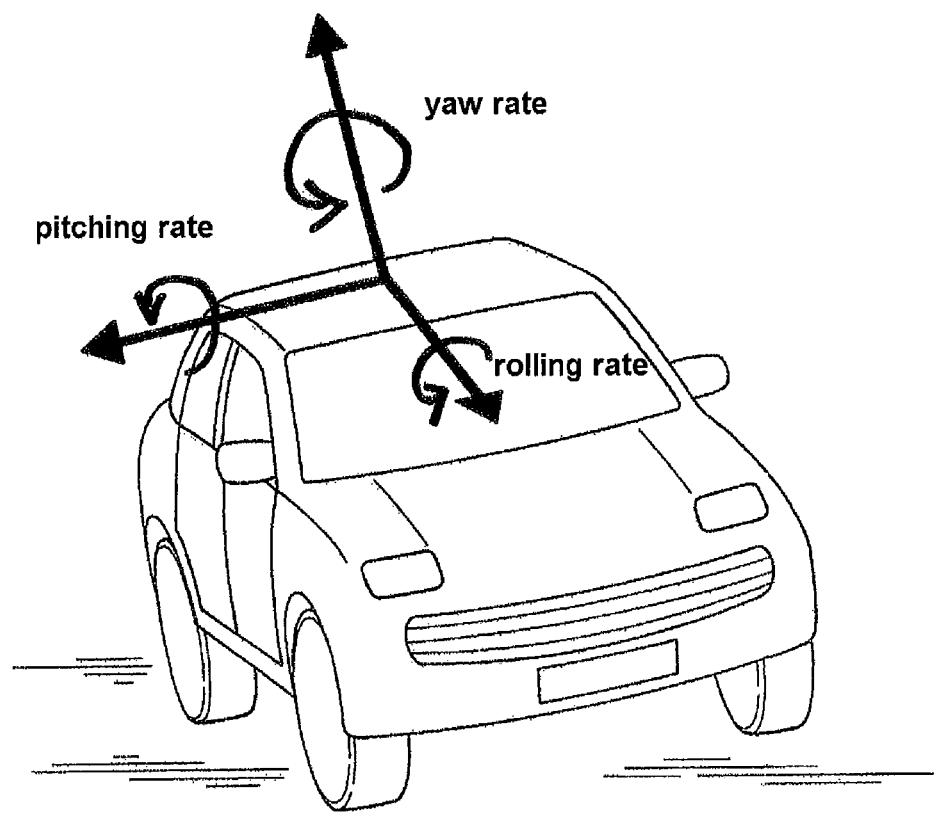
FIG. 1 depicts yaw rate, rolling rate and pitching rate of an automobile.
Figure 2:
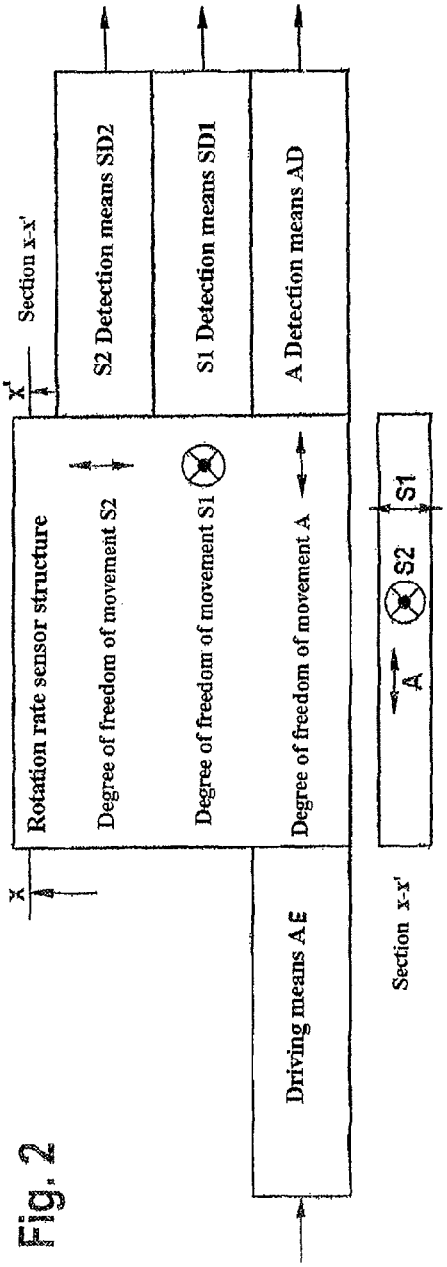
FIGS. 2-4 each depict a block diagram of a rotation rate sensor.

The rotation rate sensor preferably has detection units SD1 and SD2 in order to monitor deflections of the seismic masses in the driving direction A of the drive AD and/or in the detection directions S1 and S2. Movements along these degrees of freedom of movement are converted by these detection means into electrically measurable variables, as is illustrated with reference to FIG. 2.

Figure 3:
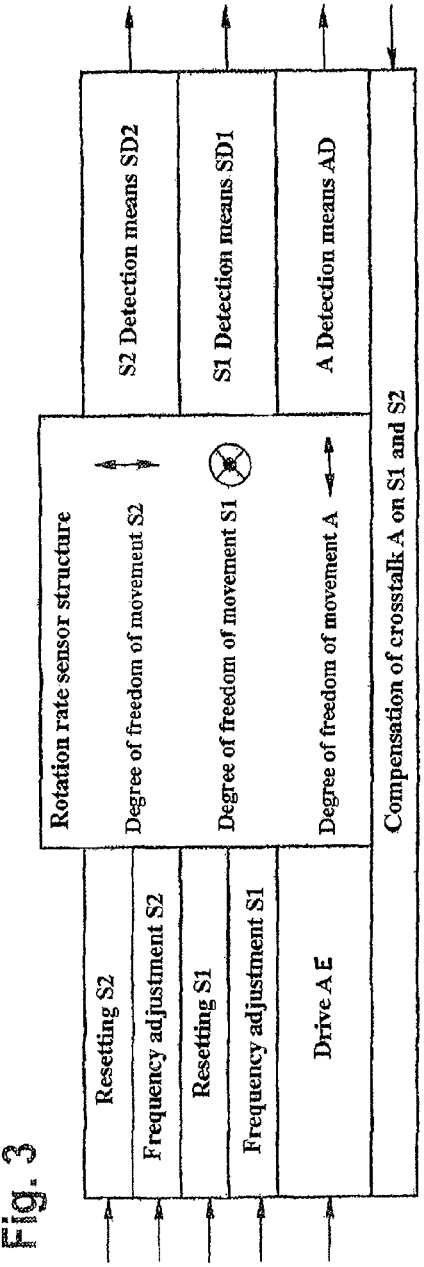

In addition, the rotation rate sensor preferably has means, such as, for example, resonant frequency-shifting actuator units and/or quadrature trimming actuator units for suppressing the crosstalk of A to S1 or S2, and for setting the natural resonant frequencies of the degrees of freedom of movement of the sensor structure in the directions S1 and S2. With these means it is possible to compensate fabrication-induced deviations from the ideal structure. Furthermore, there are means, for example resetting actuator units, which can be used to actively suppress detection movements of the sensor structure along S1 and S2, with the result that the strength of the resetting force constitutes the measure of the rotation rate, wherein these relationships are illustrated in FIG. 3.

If, for example, the rotation rate sensor is then excited to oscillate along the driving direction A and rotated about S1, a Coriolis force acts on the moved mass of the structure along S2, i.e. S1 is the 1st sensitive measurement axis of the rotation rate sensor element. The Coriolis force causes a movement of parts of the sensor structure or of the entire sensor structure along S2, which movement is converted with SD2 into an electrically measurable variable which is proportional to the Coriolis force. If the rotation rate sensor is, for example, rotated about S2, a Coriolis force acts thereon along S1, i.e. S2 is the 2nd sensitive axis of the rotation rate sensor element. This causes a movement of parts of the sensor structure or of the entire sensor structure along S1, which is converted with SD1 into an electrically measurable variable which is proportional to the Coriolis force. The Coriolis force which occurs is essentially proportional to the external rotation rate and to the amplitude of the seismic mass here. For this reason, the drive unit preferably excites the seismic mass in its resonant frequency fA, with the result that a maximum oscillation amplitude is reached with a low driving power by virtue of the mechanical amplification (quality of the oscillator). When a Coriolis force acts, a force component in the direction of S1 or S2 is generated at this driving frequency. In the text which follows, different exemplary sequences of resonant frequencies which ensure measurement of rotation rates about S1 and S2 are illustrated. The relative position of the resonant frequencies, described by the frequency differences $\Delta fS1 = fS1 - fA$ and $\Delta fS2 = fS2 - fA$, is important here. In this case, fS1 is the first reading out resonant frequency, fS2 is the second reading out resonant frequency and fA is the driving resonant frequency.

In order to avoid the drive and detection means mutually exciting one another to oscillate when there is external interference, the resonant frequency of S1 and S2 is preferably unequal to the resonance of the drive A. This frequency interval with respect to A therefore affects the sensitivity of SD1 and SD2, and the closer these are to one another the higher the mechanical amplification by the increase in the resonance. However, the sensitivity of the system to external (low-frequency) interference of the sensor and of the reading-out electronics is also higher. In addition, when there are small frequency differences $\Delta fS1$ and $\Delta fS2$ the relative change in the amplification of the rotation rate is greater if the absolute value of the frequency differences $\Delta fS1$ and $\Delta fS2$ changes as a result of external influences.

The two detection frequencies or the first and second reading out resonant frequencies are, in particular, also selected such that the interval $|fS2-fS1|$ is as large as possible in order to avoid possible (low-frequency) interference of the sensor and of the reading out electronics in the vicinity of the frequency $|fS2-fS1|$. When the detection frequencies are set, a compromise therefore has to be made between the maximum amplification of the rotation rate and a low susceptibility to interference.

The sensor with separated modes has, in particular, relatively low rotation rate amplification compared to a sensor with adapted modes but is designed to be less sensitive with respect to environmental influences and requires fewer compensation mechanisms.

The rotation rate sensor preferably has a design which satisfies the following relationships: $\Delta fS1, \Delta fS2 > 0$ or $\Delta fS1, \Delta fS2 < 0$. In this case, both detection frequencies are above or below the driving frequency.

Alternatively, the rotation rate sensor preferably has a design which satisfies the following relationships: $\Delta fS1 > 0$, $\Delta fS2 < 0$ or $\Delta fS1 < 0$, $\Delta fS2 > 0$. In this case, one detection frequency or reading out resonant frequency is above the driving frequency, and the other detection frequency or reading out resonant frequency is below the driving frequency. It is simpler here both for the detection direction S1 alone and for the detection direction S2 alone to make a compromise for $\Delta fS1$ and $\Delta fS2$ with respect to the susceptibility to interference and the maximum amplification of the rotation rate. The difference frequency $|fS2-fS1|$ is preferably selected here to be relatively large again in order to be insensitive to interference and to avoid crosstalk.

The rotation rate sensor expediently has at least partial mode adaptation. In contrast to the sensor with separated modes, it is possible to adapt one or both detection frequencies to the driving frequency. The amplification of the rotation rate is, because of the resonant excitation of the detection oscillator, dependent on the quality of the detection oscillator, that is to say on the quality of the second or third oscillator configuration, and is significantly higher than in the case with separated modes if the detection oscillator is not overdamped. Changes to the frequency spacing between the driving frequency and the detection frequency may, however, possibly result in relatively large changes in the amplification of the rotation rate depending on the quality. External influences which influence the quality levels and/or position of the frequencies may possibly have relevant effects on the amplification of the rotation rate and possibly have to be compensated. This may be provided for, for example, in the design by providing suitable means, such as a resonant frequency-shifting actuator unit, which can be used to electrically track a resonant frequency. Furthermore, devices can be provided with which the quality level is regulated electronically.

Since the detection movement can be excited to undergo very strong oscillations by virtue of the adaptation of the modes, it is possible for the amplitude of the oscillation to occur in the non-linear range of the spring elements of the detection oscillator or in the non-linear range of the reading out means. For this reason, it may be appropriate to make means available which, for example, reset the detection movement, for example with a resetting actuator unit, with the result that the resetting force can be taken as a measure of the amplification of the rotation rate. A further effect of the adaptation of the modes is the reduction in the bandwidth of the rotation rate sensor. The bandwidth is here the frequency spectrum of external rotation rates for which the amplification of a rotation rate with the amplitude $\Omega$ differs from the amplification of a constant rotation rate $\Omega_{const}$ by less than 3 dB. While the bandwidth in the case of a sensor with separated modes corresponds to approximately half the difference between the driving frequency and the detection frequency, the bandwidth for the sensor with adapted modes tends toward zero as the quality increases. Again, devices may be provided with which the quality level is regulated electronically.

The sensor with adapted modes has relatively large amplification of the rotation rate compared to the sensor with separated modes.

The rotation rate sensor preferably has a design which satisfies the following relationships: $\Delta fS1=0$ or $\Delta fS2=0$. In this case, the frequency of one of the two detection oscillations, that is to say the first or the second reading out resonant frequency, is identical to the driving frequency or to the driving resonant frequency, with the result that the rotation rate about the corresponding rotation rate axis is detected with adapted modes. The detection of the rotation rate about the other sensitive axis takes place with separated modes. Depending on the level of accuracy demanded of the corresponding reading out device, the amplification of the rotation rate can be determined particularly precisely about a sensitive axis.

The rotation rate sensor preferably has a design which satisfies the following relationships: $\Delta fS1=0$ and $\Delta fS2=0$. In this case, the frequencies of the two detection oscillations or the first and the second reading out resonant frequencies are identical to the driving frequency. Rotation rates about the two sensitive axes can be measured very precisely.

The rotation rate sensor preferably comprises at least a decoupling system or decoupling means.

There are various possible ways of arranging the spring elements, masses, excitation units and reading out units of a vibrating rotation rate sensor. In particular, it is advantageous to decouple the drive unit (AE) of the driving oscillation from the reading out unit (SD) of the detection oscillation in order to avoid cross-coupling between these two units. However, this decoupling typically brings about a reduction in the sensitivity and an increase in the space required. The degree of coupling of the drive unit (AE), of the drive detection unit (AD), of the detection unit (SD) and of the seismic mass (SM) on which the Coriolis force acts is defined in more detail below. The following principles respectively relate to a sensitive axis of the dual-axis rotation rate sensor.

Figure 7:
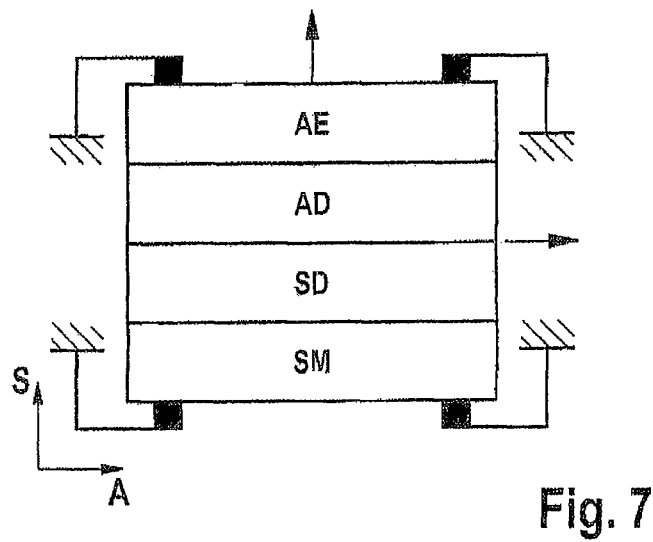
FIG. 7 depicts a preferred arrangement for decoupling or embodying the rotation rate sensor.

A preferred arrangement for decoupling or embodying the rotation rate sensor is illustrated in FIG. 7. In this context, the drive unit (AE), drive detection unit (AD), detection unit (SD) and the seismic mass (SM) are connected to one another rigidly and have degrees of freedom in the driving direction (A) and reading out direction (S). This arrangement has the highest amplification of the rotation rate since the Coriolis force can act on the seismic mass (SM) and on the masses of the drive unit (AE), the drive detection unit (AD) and the detection unit (SD). In addition, this arrangement requires the fewest spring elements in order to permit decoupling, for which reason the completely coupled arrangement has the smallest spatial extent.

There are two possible ways of implementing simple decoupling. One sensor is preferably referred to as single-decoupled if, in contrast to the completely coupled arrangement, either the movement possibilities of the drive unit which is rigidly coupled to the drive detection unit or the movement possibilities of the detection unit are restricted to the degree of freedom in the driving direction or detection direction.

Figure 8:
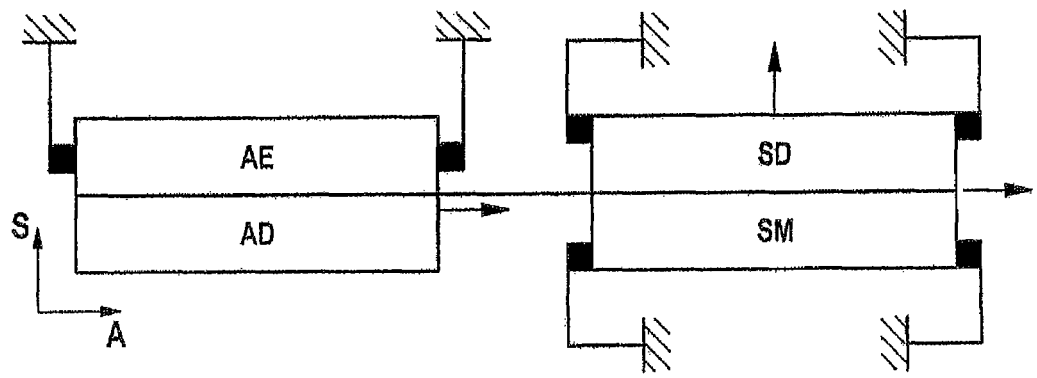
FIG. 8 depicts a first exemplary possibility for a single-decoupled rotation rate sensor principle.

The first exemplary possibility for a single-decoupled rotation rate sensor principle is that the drive unit (AE) and the drive detection unit (AD) are connected to one another rigidly and have a degree of freedom only in the driving direction (A); the detection unit (SD) and the seismic mass (SM) are rigidly connected to the driving mass in the driving direction (A) by means of spring elements, but have, in relation to the degree of freedom in the driving direction, a further degree of freedom in the reading out direction (S), as is illustrated on the basis of FIG. 8. This arrangement has the same amplification of the rotation rate as the completely coupled principle, since the Coriolis force which can act only on the seismic mass (SM) and on the mass of the detection unit (SD) only has, in fact, to move the seismic mass (SM) and the detection unit in the case of a rotation rate. The advantage of the single-decoupled rotation rate sensor is here the fact that during the detection movement there are no effects on the drive unit, as a result of which interference influences from the reading out movement on the driving movement are suppressed.

Figure 9:
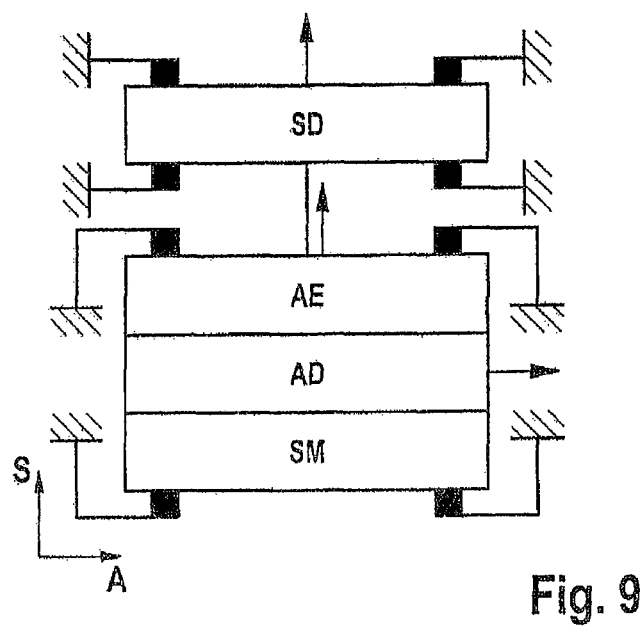
FIG. 9 depicts a second exemplary possibility for a single-decoupled rotation rate sensor principle.

A second exemplary possibility of a single-decoupled rotation rate sensor principle is that the drive unit (AE), the drive detection unit (AD) and the seismic mass (SM) are rigidly connected to one another and have degrees of freedom in the driving direction (A) and reading out direction (S), while the detection unit (SD) is connected by means of spring elements in such a way that it only has a degree of freedom in the reading out direction (S), see FIG. 9. The advantage of the single-decoupled rotation rate sensor is here the fact that the detection unit does not move during the driving movement, as a result of which interference influences from the driving movement on the reading out movement are suppressed.

The single-decoupled rotation rate sensor requires more spring elements than the completely coupled arrangement in order to permit the decoupling, for which reason the single-decoupled sensor has a larger spatial extent than the completely coupled sensor.

Figure 10:
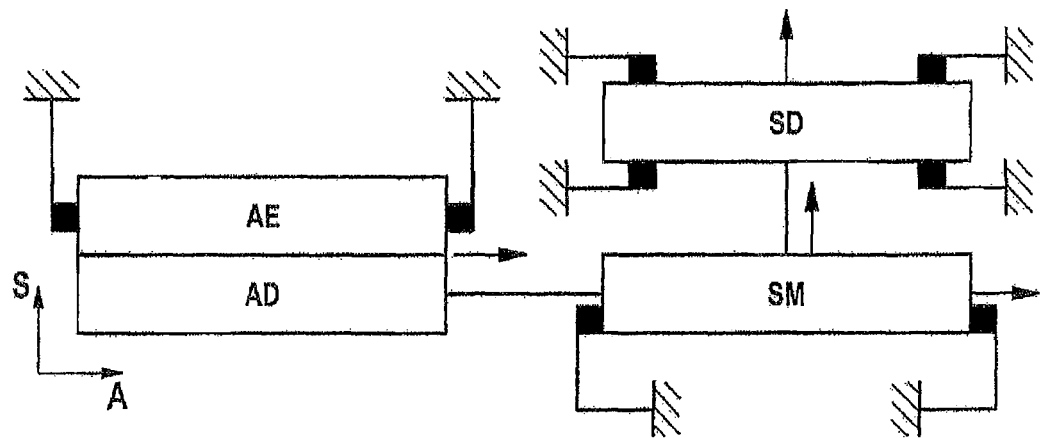
FIG. 10 depicts a double-decoupled rotation rate sensor principle.

The term double-decoupled rotation rate sensor principle is preferably used if the drive unit (AE) and the drive detection unit (AD) are rigidly connected to one another and only have the degree of freedom in the driving direction (A); the seismic mass is rigidly connected to the drive unit in the driving direction but has degrees of freedom in the driving direction (A) and reading out direction (S) and by means of spring elements is rigidly connected in the reading out direction (S) to the detection unit (SD), which only has the degree of freedom in the reading out direction (S), see FIG. 10. This arrangement has relatively low amplification of the rotation rate since the Coriolis force can act only on the seismic mass (SM) and not on the masses of the (unmoved) detection unit (SD), of the drive unit (AE) (unmovable in the reading out direction) and of the drive detection unit (AD); the detection unit must, however, be moved for the purpose of detecting the rotation rate. In addition, this arrangement requires more spring elements than the completely coupled or the single-decoupled arrangement in order to permit the decoupling, for which reason the double-decoupled sensor has a relatively large spatial extent. The advantage of the double-decoupled rotation rate sensor is that, on the one hand, the detection unit does not move during the driving movement, and, on the other hand, the drive unit and drive detection unit remain at rest during the detection movement, and this brings about further suppression of interference influences.

Figure 11:
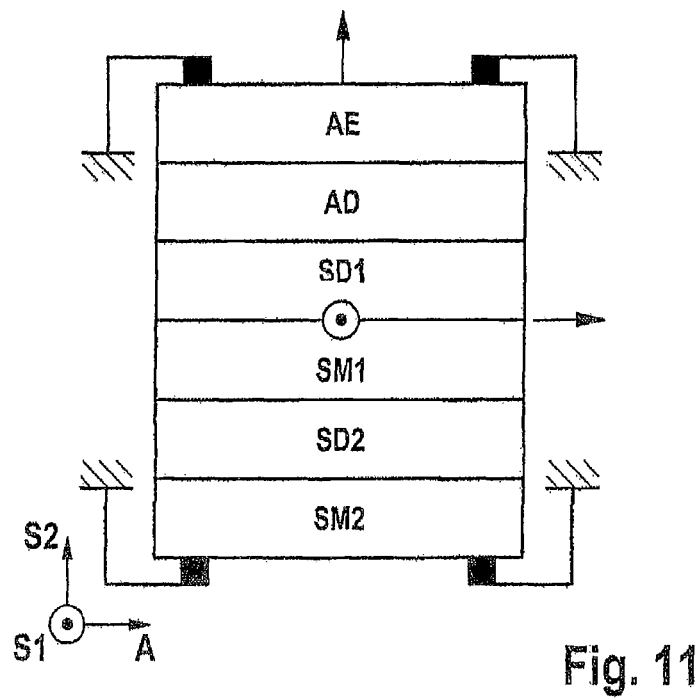
FIG. 11 depicts a coupled rotation rate sensor in which the drive unit (AE), the drive detection unit (AD), the two detection units (SD1 and SD2) and the two seismic masses (SM1 and SM2) are rigidly connected to one another and have degrees of freedom in all three spatial directions.

For the arrangement of a dual-axis sensor, for example corresponding combinations of the above-mentioned coupling models are possible. FIG. 11 shows, for example, a completely coupled rotation rate sensor in which the drive unit (AE), the drive detection unit (AD), the two detection units (SD1 and SD2) and the two seismic masses (SM1 and SM2) are rigidly connected to one another and have degrees of freedom in all three spatial directions. FIG. 12 shows, as an example, a sensor in which the detection unit SD2 and the seismic mass SM2 are completely coupled to the drive unit; the drive unit (AE) which is rigidly connected to the drive detection unit (AD) is single-decoupled from the detection unit SD1, which is rigidly connected to the seismic mass SM1 and has degrees of freedom in the A, S1 and S2 directions (single decoupling with drive disengagement). The seismic mass SM2 is redundant in the S2 direction owing to the rigid coupling to the seismic mass SM1 and can be omitted. SM1 then serves as a seismic mass for both detection directions S1 and S2. FIG. 13 shows, as an example, a sensor in which the detection unit SD2 and the seismic mass SM2 are connected in a double-decoupled fashion to the drive unit; the drive unit (AE) which is rigidly connected to the drive detection unit (AD) is single-decoupled from the detection unit SD1, which is rigidly connected to the seismic mass SM1 and has degrees of freedom in the A and S1 directions (single decoupling with drive disengagement).

The additional seismic mass in FIGS. 12 and 13 is embodied, for example, as a rotation-rate-sensitive component mass, for example SM1. The other seismic mass, for example SM2, is embodied, for example, as a seismic basic mass.

Figure 4:
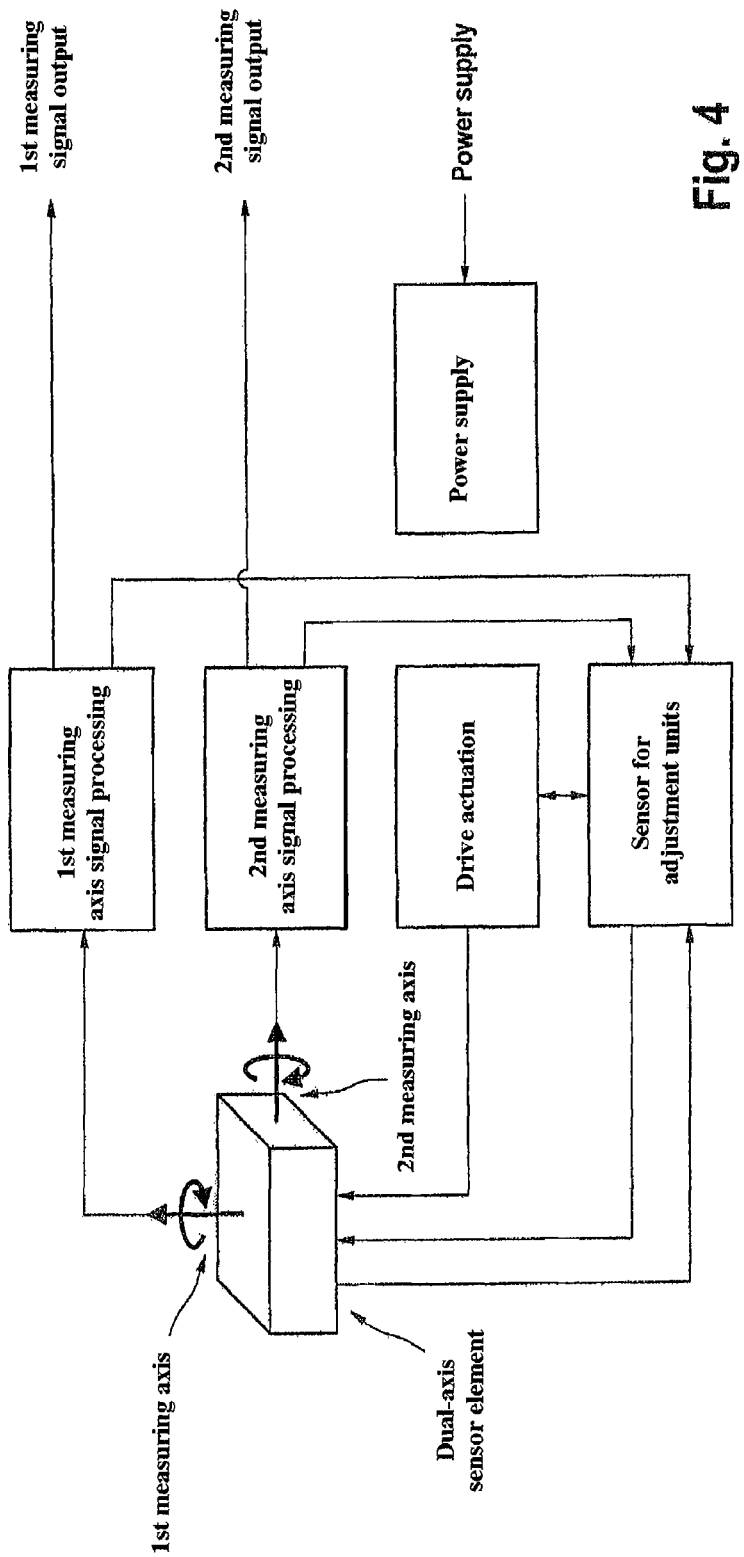
Figure 5:
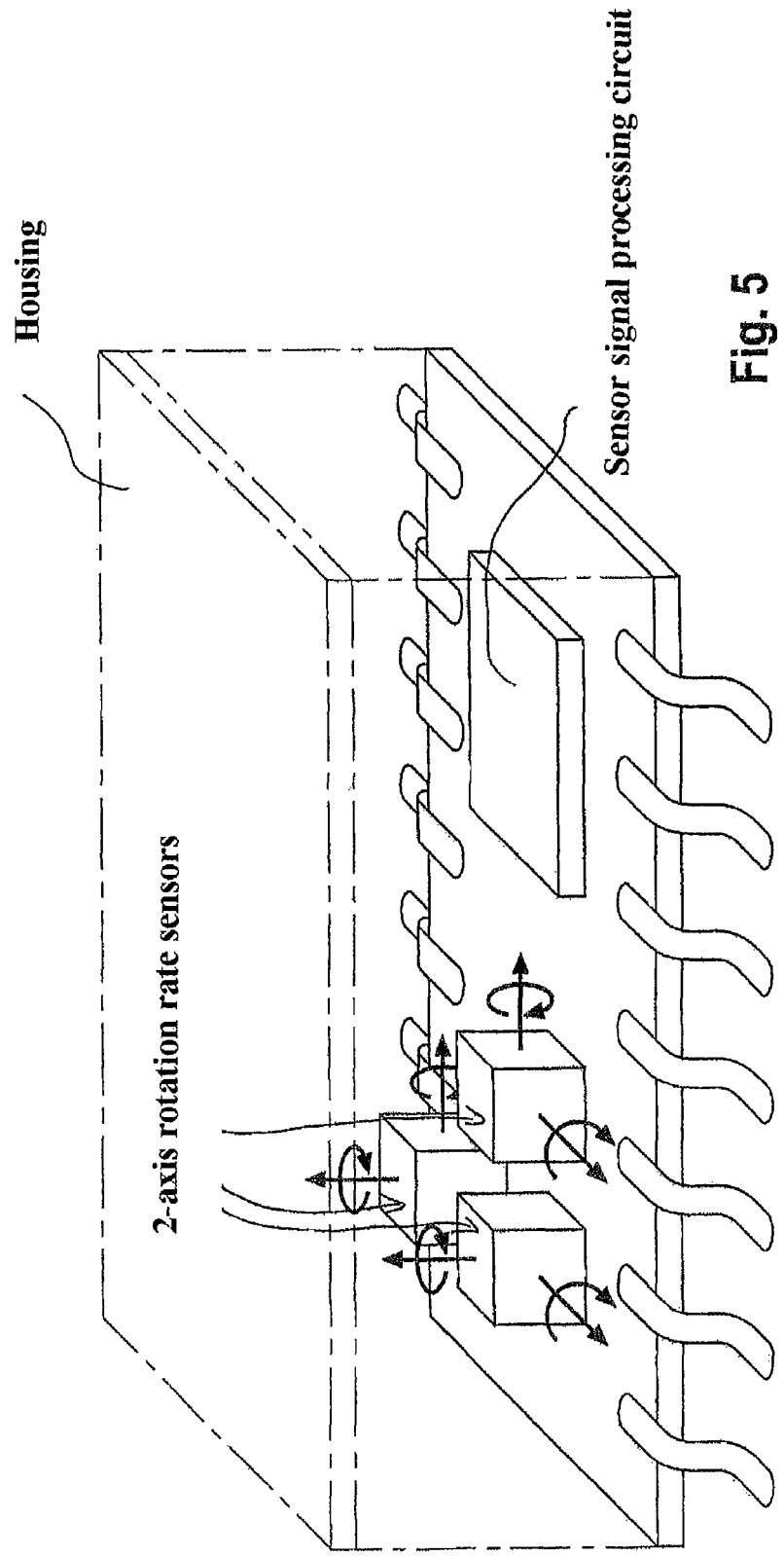
FIG. 5 depicts the structure of the rotation rate sensor.

By virtue of the preferred common use of the drive and drive monitoring means for both measuring tasks, it is possible, in contrast with the arrangement composed of individual sensor elements, to manufacture small and therefore more cost-effective rotation rate sensor elements for measuring more than one direction of rotation. In addition, during the processing of signals it is possible to eliminate one drive unit and drive control means, as well as a voltage supply, reference frequency signal generator and many more, see FIG. 4. As a result, it is also possible, in particular through the combination of multiple dual-axis rotation rate sensors, to manufacture configurations or sensor arrangements which monitor all the rotational degrees of freedom of a moved body and at the same time monitor one or more degrees of freedom by means of redundant measuring axes, as illustrated by way of example in FIG. 5. However, in contrast to complete integration on one chip, it is also possible to test the individual elements before integration in a housing and therefore to optimize the yield of the integrated system. Furthermore, a flexible configuration of various measuring tasks remains possible without having to develop and produce a modified sensor element. As a result, the sensor elements can be manufactured more cost-effectively by virtue of higher production numbers of the same element.

Figure 6:
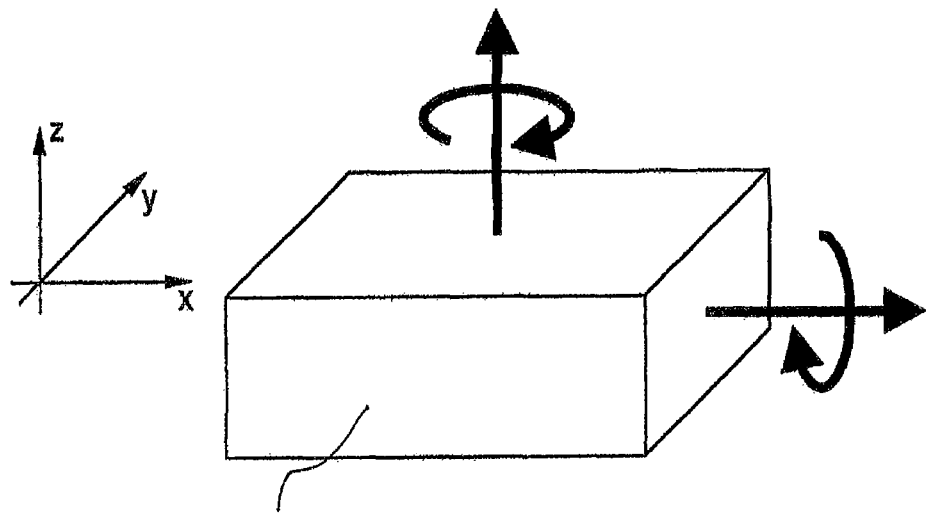
FIG. 6 depicts the rotation rate sensor with respect to a Cartesian coordinate system.

The rotation rate sensor is preferably embodied in such a way that it can detect rotation rates about the x axis and the z axis of a Cartesian coordinate system as sensitive axes. The two measuring axes S1 and S2 are, by virtue of the design, orthogonal with respect to the wafer surface (S1), or parallel thereto (S2). In the Cartesian coordinate system, the measuring axis S1 is the z direction and S2 is the x direction, see FIG. 6. If the element is constructed, for example, horizontally in a housing and the latter is mounted horizontally on a printed circuit board, it is possible given horizontal installation in a vehicle S1 (z axis), to monitor the yaw rate of the vehicle, and S2 can monitor the rolling rate or pitching rate, and in the case of vertical installation of the printed circuit board S2 can monitor the yaw rate and S1 can monitor the rolling rate or pitching rate. As a result, complicated and expensive sensor structures in a housing or on a printed circuit board, such as would be the case in a dual-axis rotation rate sensor with the measuring axes only in the plane of the wafer (x and y directions), in order to cover all possible installation variants, are dispensed with. In the case of an x/y rotation rate sensor it is necessary, in the case of horizontal installation of a printed circuit board, to mount either the element or the element in the housing perpendicularly on the printed circuit board in order to be able to monitor the yaw rate of the vehicle.

In order to be as insensitive as possible to external interference influences, the dual-axis rotation rate sensor is preferably constructed in such a way that it comprises at least two seismic masses for each sensitive axis. The latter are arranged in such a way that they are excited in reaction to an external rotation rate to undergo anti-phase oscillations. The seismic masses are, for this purpose, each driven in anti-phase in the driving direction. This has the additional advantage that given a symmetrical sensor arrangement the center of gravity of the entire sensor remains at rest and interactions with the surroundings during the driving movement are avoided. External interference due to linear accelerations, for example, which would lead to common-phase deflection of the seismic masses, can be differentiated from reactions to rotation rates by virtue of this form of the arrangement. In order to further suppress external interference of the arrangement, it is of particular advantage to connect, directly or indirectly to one another the detection units of the seismic masses which oscillate in antiphase, in particular in such a way that only antiphase detection movements are permitted. Forth's purpose, it is possible to suspend one or more coupling beams (CB) in a rotational fashion such that only antiphase movements of the detection units are permitted, cf. our patent application "Unterdrückung von parasitaren Moden bei resonant gekoppelten mikromechanischen Drehratesensoren [Suppression of parasitic modes in resonant-coupled micromechanical rotation rate sensors]".

Figure 15:
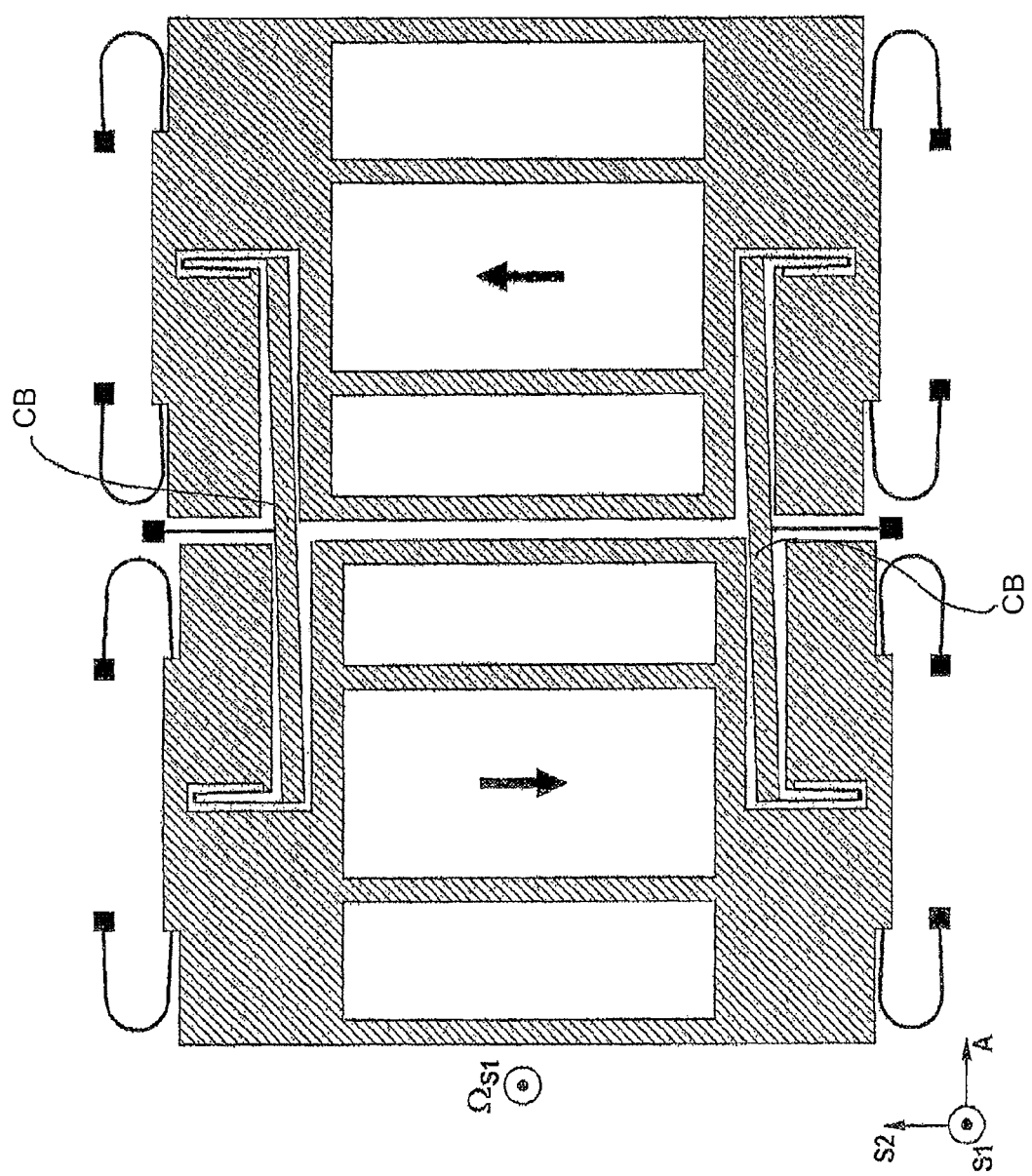
FIG. 15 depicts detection units SD2L and SD2R coupled by means of two coupling beams CB.

FIG. 14 shows an exemplary dual-axis rotation rate sensor which is constructed from two seismic masses (SM1L=SM2L and SM1R=SM2R) which oscillate with respect to one another. In this context, the seismic masses of one side (SM1L=SM2L and SM1R=SM2R) are respectively completely coupled to the respective drive unit (AEL or AER), drive detection units (ADL or ADR) and detection unit (SD1L and SD2L or SD1R and SD2R), cf. FIG. 7. The detection units SD2L and SD2R are coupled by means of two coupling beams CB, as illustrated with respect to FIG. 15, in such a way that they can only move in antiphase in the S2 direction. This is the movement which is carried out in the case of a rotation rate about the S1 axis. If linear accelerations occur in the S2 direction, they are blocked by the beam which is suspended in a rotational fashion.

Figure 16:
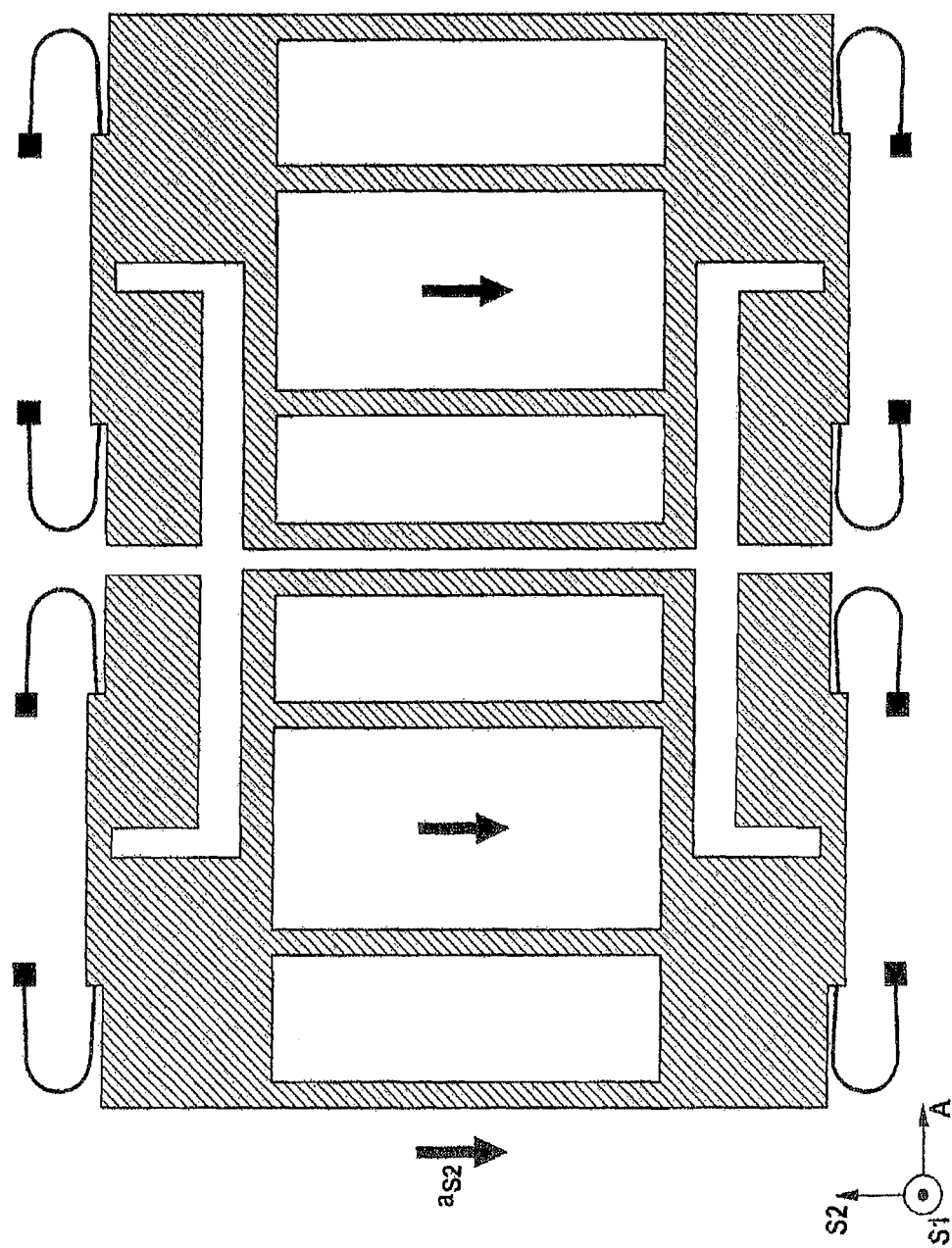
FIG. 16 depicts the reaction of the rotation rate sensor without a coupling beam to a linear acceleration aS2 in the S2 direction.
Figure 17:
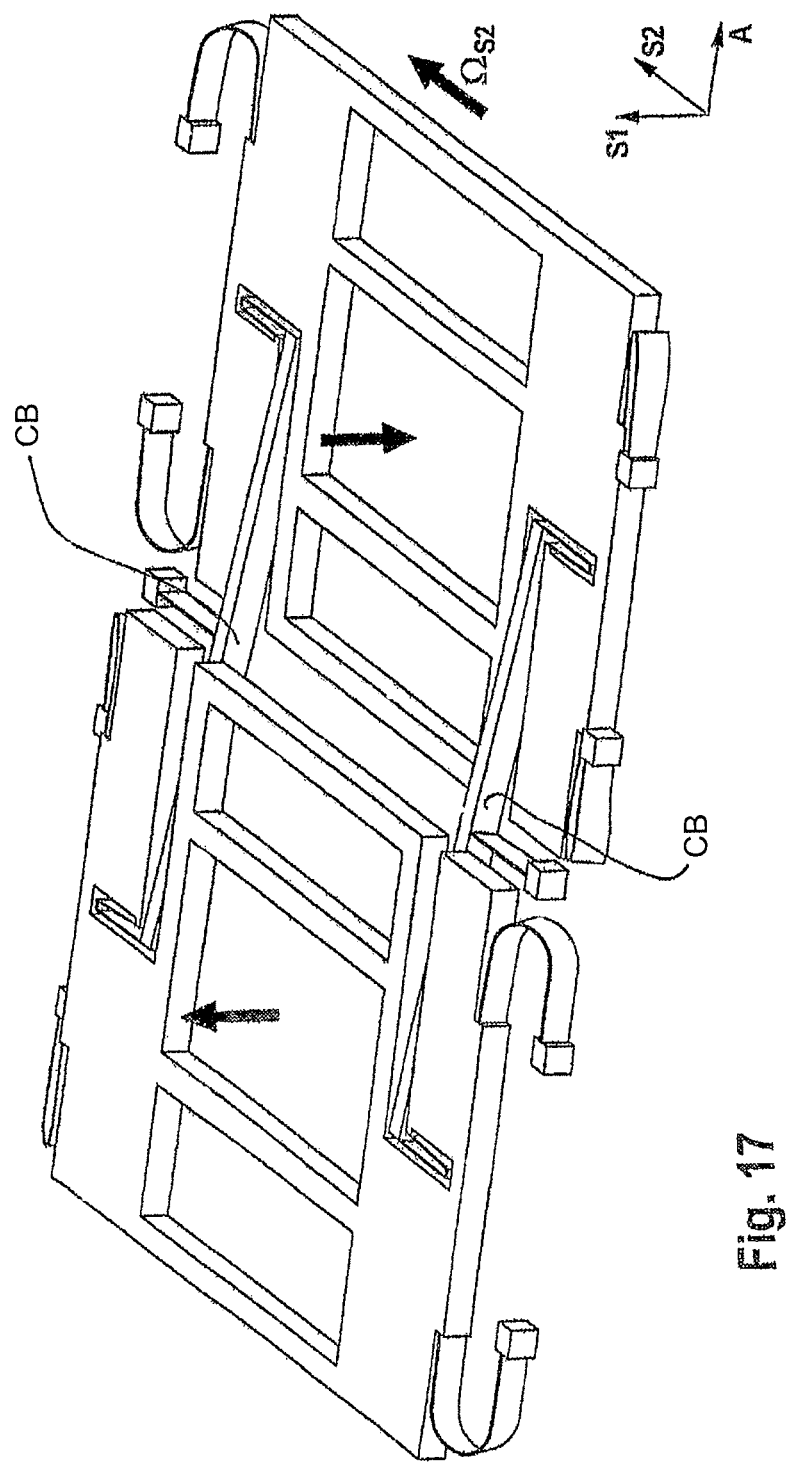
FIG. 17 depicts detection units SD1L and SD1R coupled via the same coupling beams CB.

FIG. 16 illustrates, by way of example, the reaction of the rotation rate sensor without a coupling beam to a linear acceleration aS2 in the S2 direction. The detection units SD1L and SD1R are, as illustrated in FIG. 17, coupled via the same coupling beams CB in such a way that they can move only in antiphase in the S1 direction. This is the movement which is carried out in the case of a rotation rate about the S2 axis. If linear accelerations occur in the S1 direction, they are blocked by the beam which is suspended in a rotational fashion.

Figure 18:
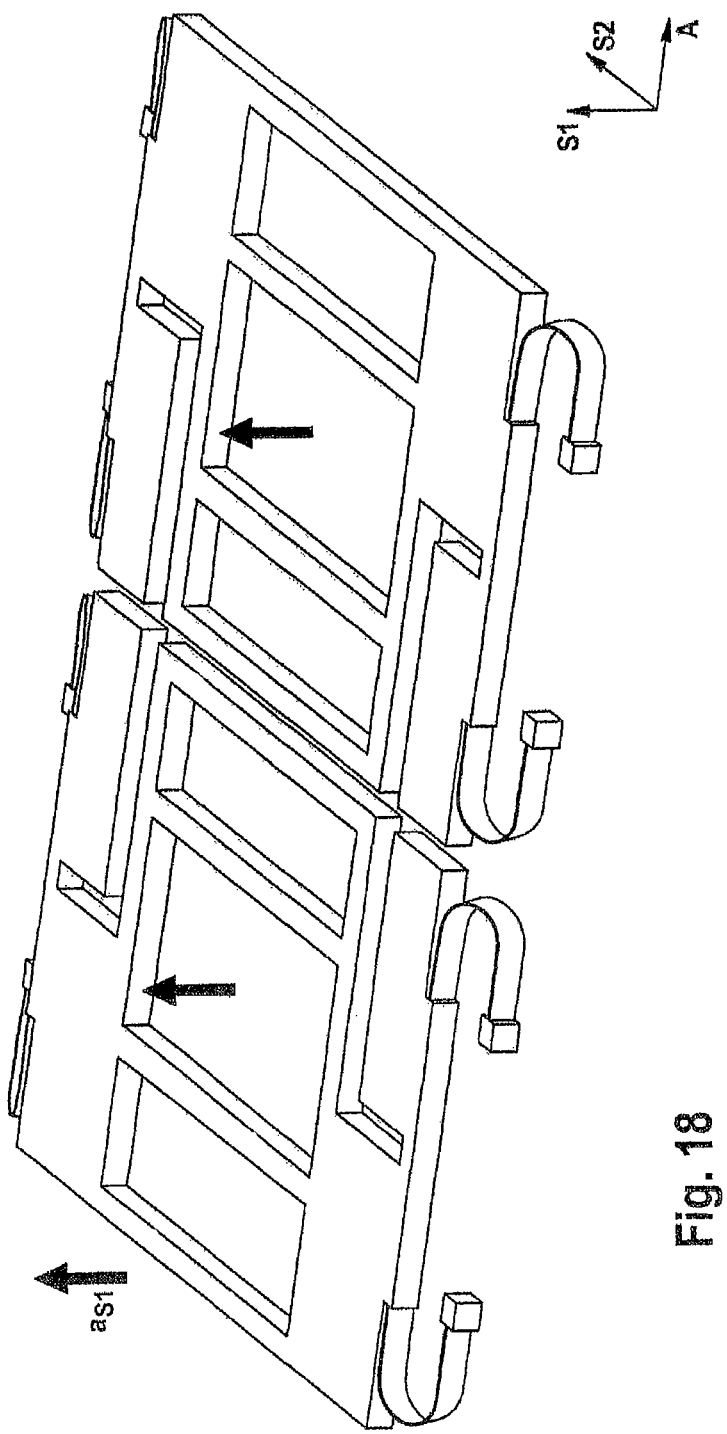
FIG. 18 depicts the reaction of the rotation rate sensor without a coupling beam to a linear acceleration aS1 in the S1 direction.

FIG. 18 illustrates by way of example the reaction of the rotation rate sensor without a coupling beam to a linear acceleration aS1 in the S1 direction.

Figure 19:
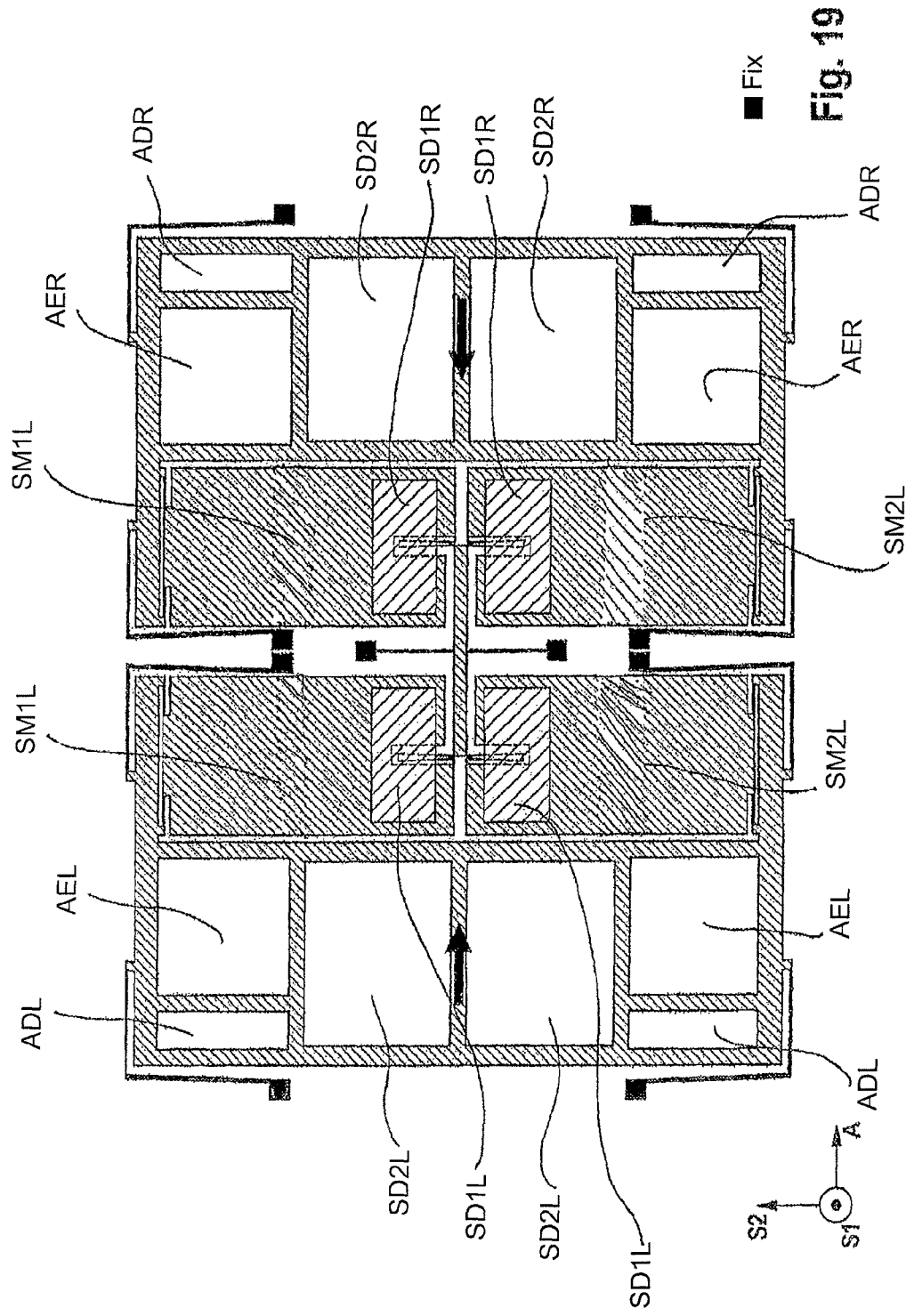
FIG. 19 depicts an exemplary embodiment of a dual-axis rotation rate sensor which is constructed from seismic mass pairs (SM1L=SM2L and SM1R=SM2R) which oscillate with respect to one another.
Figure 20:
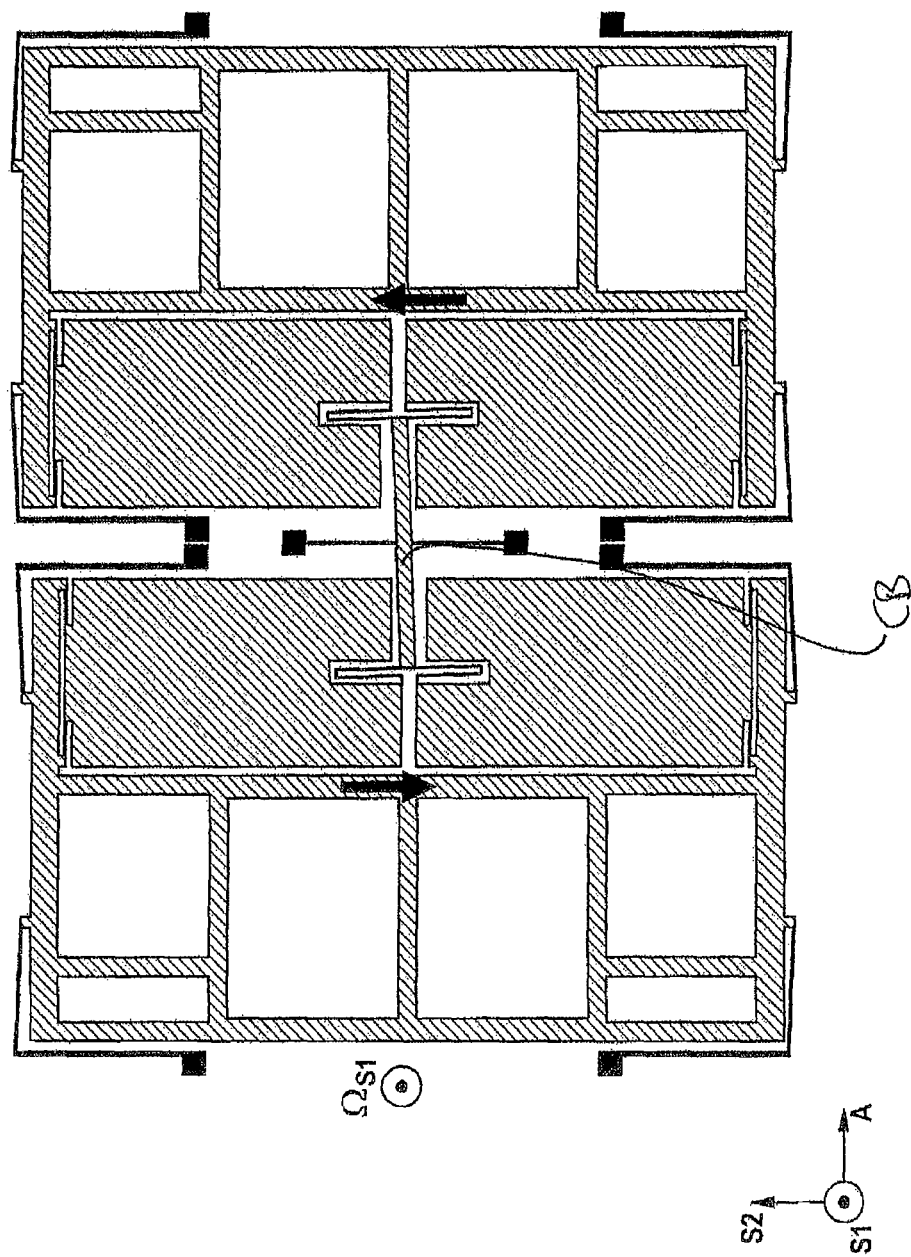
FIG. 20 depicts detection units SD2L and SD2R that are indirectly coupled via two coupling beams CB in such a way that they can move only in antiphase in the S2 direction.

FIG. 19 illustrates an exemplary embodiment of a dual-axis rotation rate sensor which is constructed from seismic mass pairs (SM1L=SM2L and SM1R=SM2R) which oscillate with respect to one another. Here, the system composed of the seismic masses for detecting a rotation rate about the S1 axis (SM1L=SM2L, and respectively SM1R=SM2R) is completely coupled to the associated detection units (SD2L, and respectively SD2R) and the respective drive units (AEL, and respectively AER) and the drive detection units (ADL, and respectively ADR). The drive units (AEL, and respectively AER) and drive detection units (ADL, and respectively ADR) are simply disengaged in the reading out direction from the seismic masses for detecting a rotation rate about the S2 axis (SM1L=SM2L, and respectively SM1R=SM2R) and the associated detection unit (SD1L, and respectively SD1R), cf. FIG. 8. The detection units SD2L and SD2R are (indirectly) coupled via two coupling beams CB (see FIG. 20) in such a way that they can move only in antiphase in the S2 direction. This is the movement which is carried out in the case of a rotation rate about the S1 axis. If linear accelerations occur in the S2 direction, they are blocked by the beam which is suspended in a rotational fashion.

Figure 21:
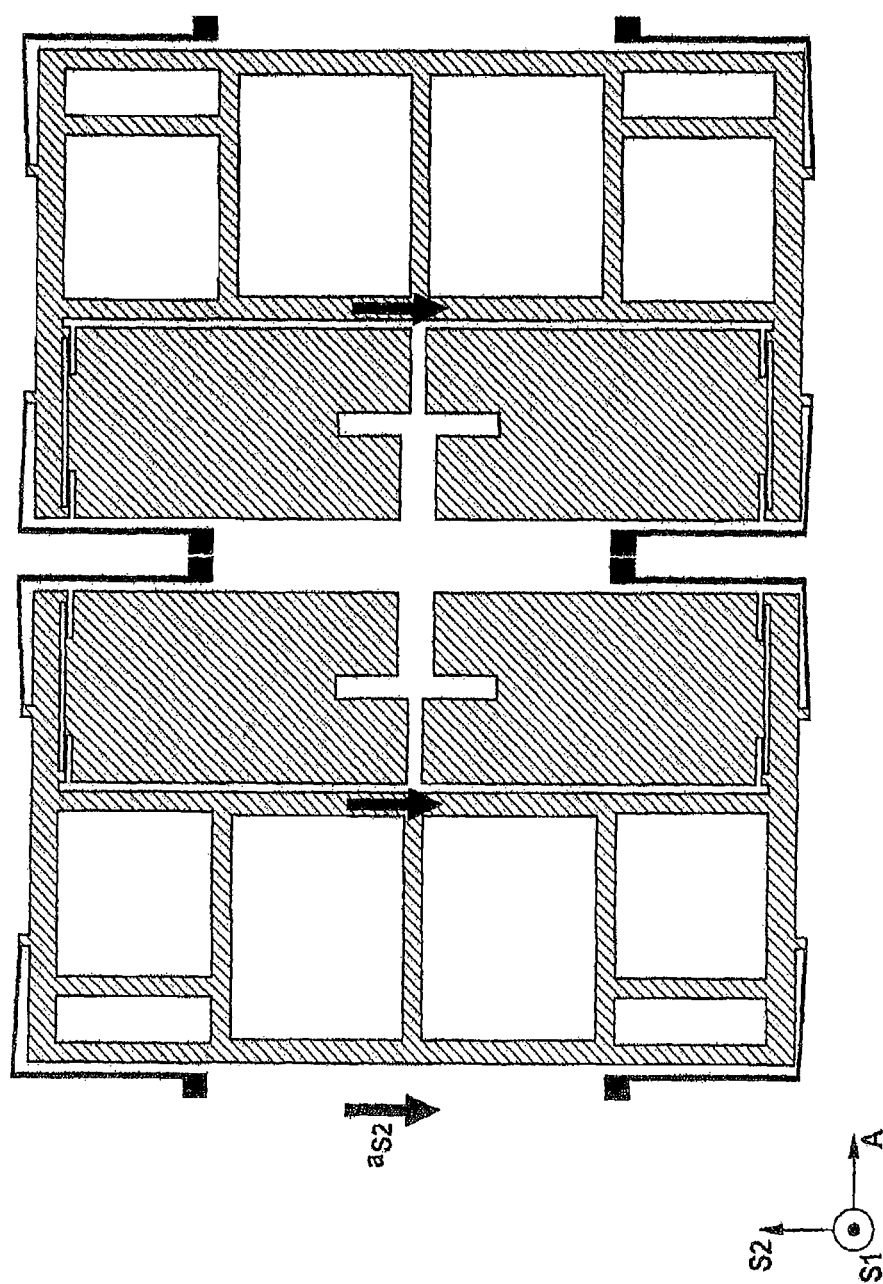
FIG. 21 depicts the reaction of the rotation rate sensor without a coupling beam to a linear acceleration aS2 in the S2 direction.
Figure 22:
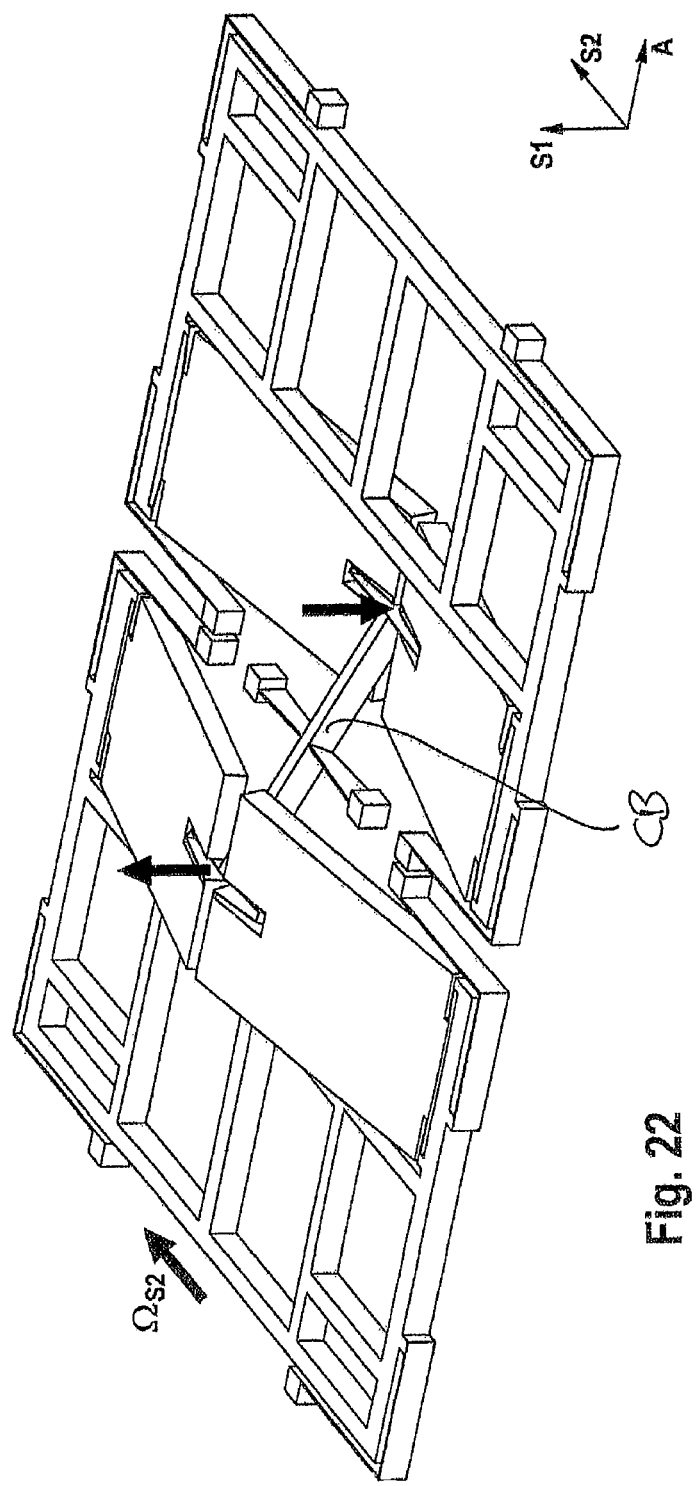
FIG. 22 depicts the detection units SD1L and SD1R coupled via the same coupling beam CB in such a way that they can move only in antiphase in the S1 direction.
Figure 27:
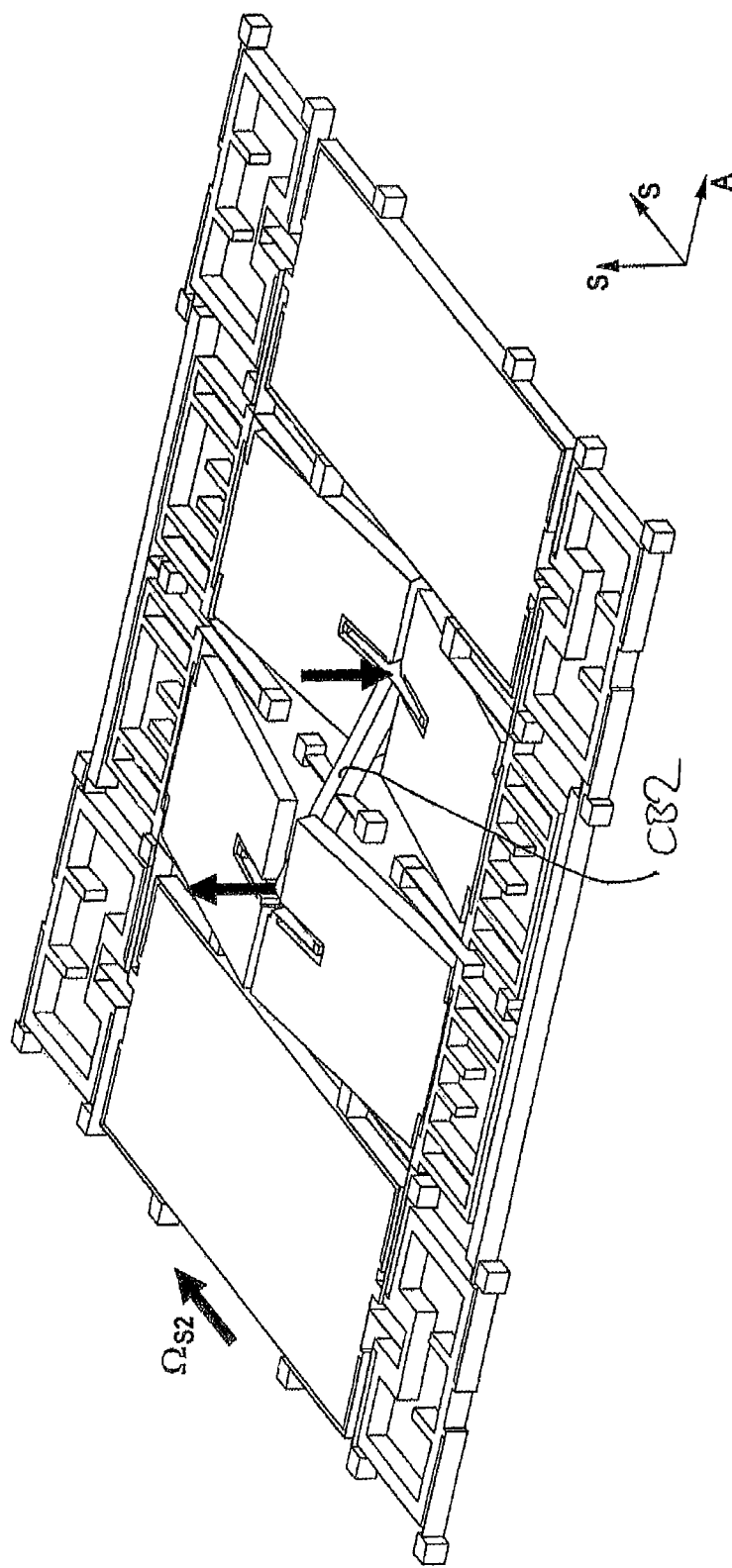
FIG. 27 depicts the detection units SD1L and SD1R coupled via the coupling beam CB2 in such a way that they can only move in antiphase in the S1 direction.

FIG. 21 illustrates, for example, the reaction of the rotation rate sensor without a coupling beam to a linear acceleration aS2 in the S2 direction. The detection units SD1L and SD1R are coupled via the same coupling beam CB (see FIG. 22 and FIG. 27) in such a way that they can move only in antiphase in the S1 direction. This is the movement which is carried out in the case of a rotation rate about the S2 axis. If linear accelerations occur in the S1 direction, they are blocked by the beam which is suspended in a rotational fashion.

Figure 23:
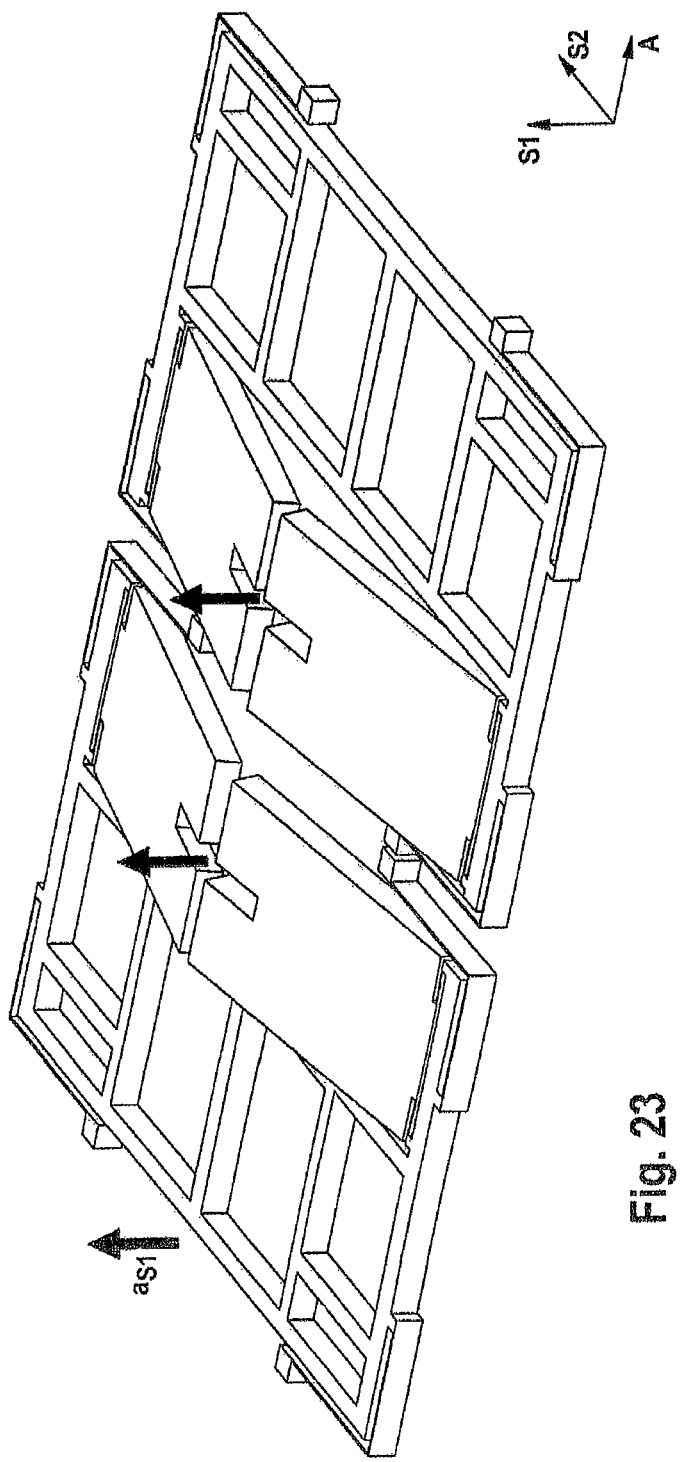
FIG. 23 depicts the reaction of the rotation rate sensor without a coupling beam to a linear acceleration aS1 in the S1 direction.

FIG. 23 illustrates, for example, the reaction of the rotation rate sensor without a coupling beam to a linear acceleration aS1 in the S1 direction.

Figure 24:
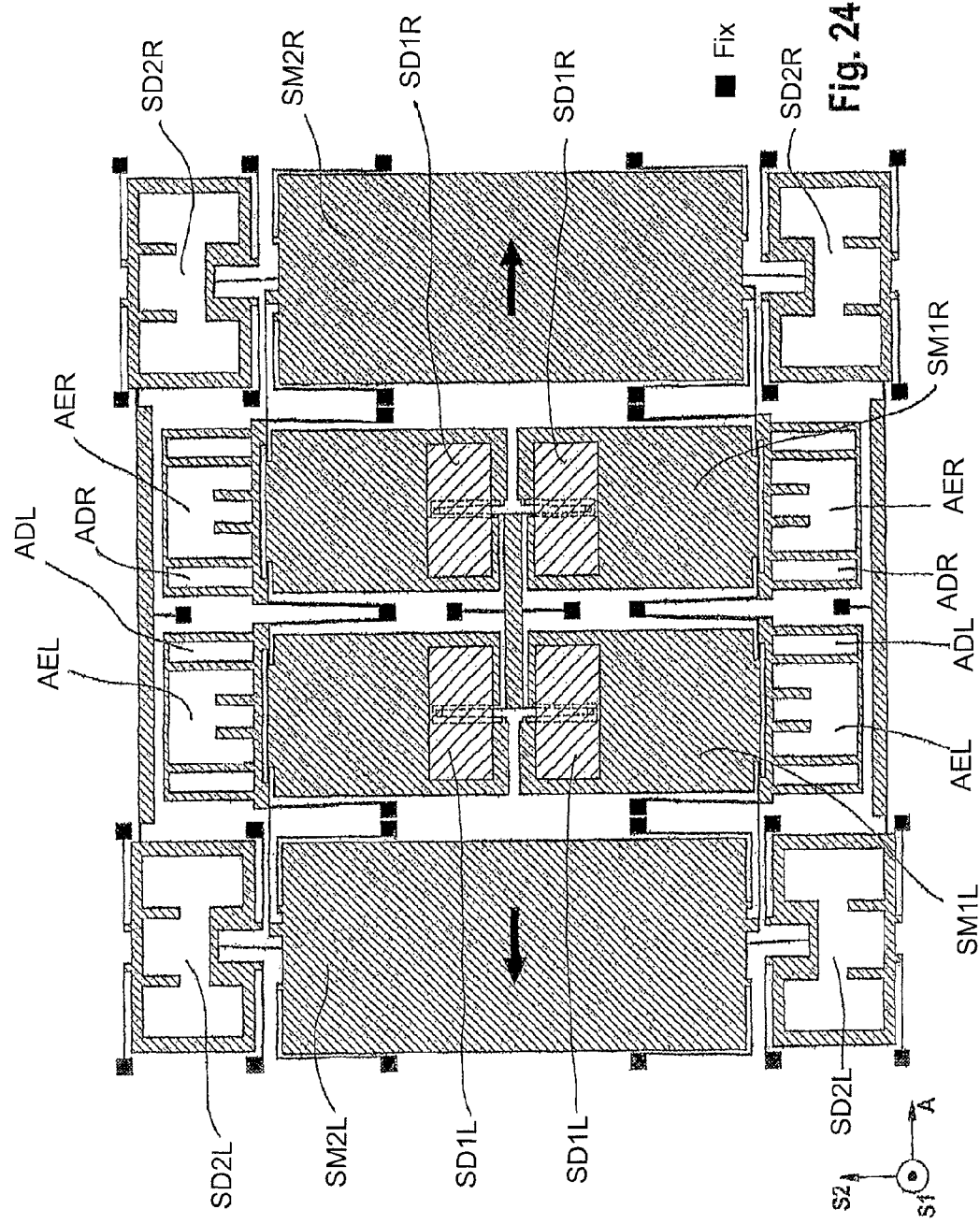
FIG. 24 depicts an exemplary embodiment of a dual-axis rotation rate sensor which is constructed from seismic mass pairs (SM1L/SM2L and SM1R/SM2R) which oscillate with respect to one another.
Figure 25:
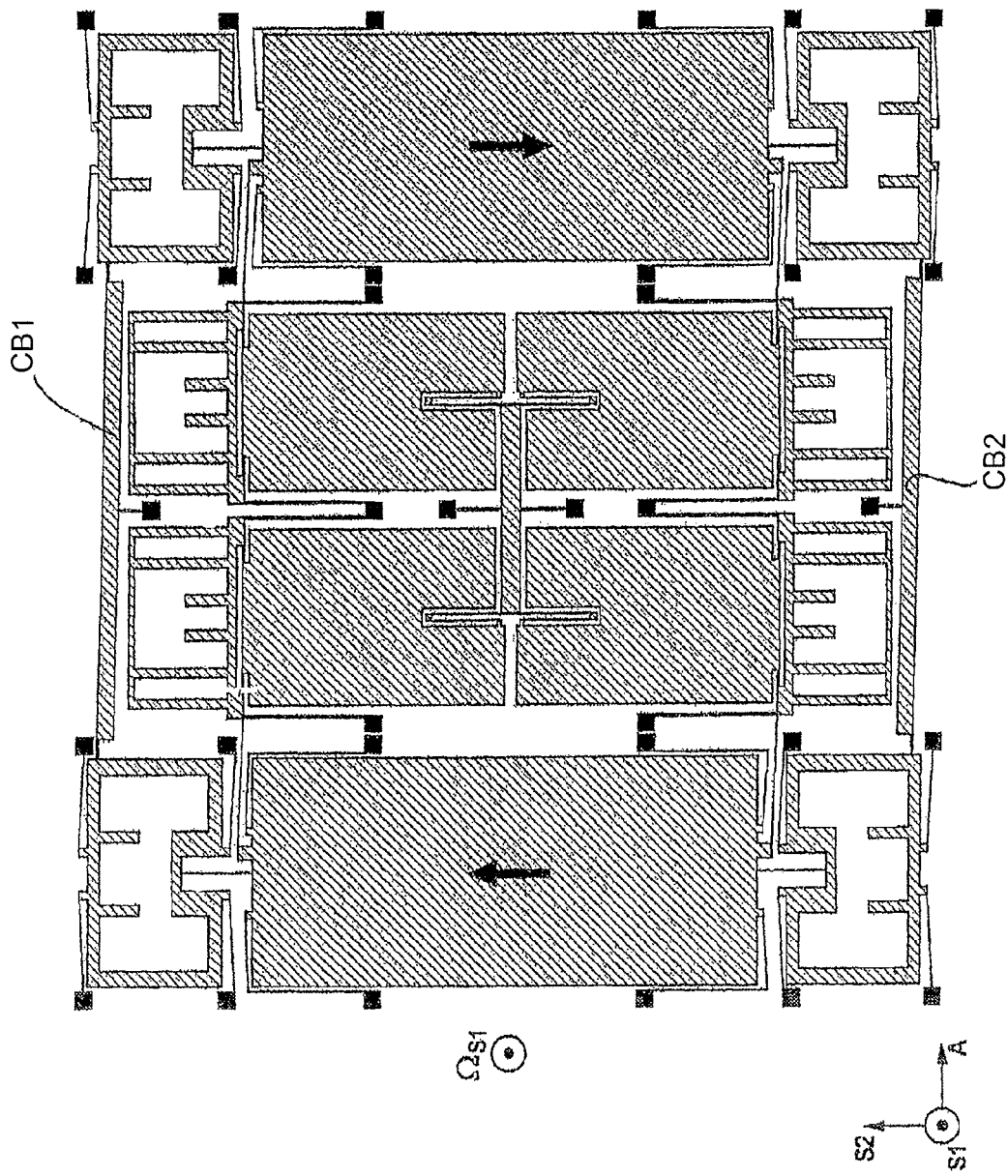
FIG. 25 depicts detection units SD2L and SD2R that are coupled via two coupling beams CB1 in such a way that they can move only in antiphase in the S2 direction.

FIG. 24 shows an exemplary embodiment of a dual-axis rotation rate sensor which is constructed from seismic mass pairs (SM1L/SM2L and SM1R/SM2R) which oscillate with respect to one another. Here, the system composed of the seismic masses for detecting a rotation rate about the S1 axis (SM2L, and respectively SM2R) are double-decoupled from the associated detection units (SD2L, and respectively SD2R) and the respective drive units (AEL, and respectively AER) and drive detection units (ADL, and respectively ADR). The drive units (AEL, and respectively AER) and drive detection units (ADL, and respectively ADR) are single-disengaged from the seismic masses for detecting a rotation rate about the S2 axis (SM1L, and respectively SM1R) and the associated detection unit (SD1L, and respectively SD1R), cf. FIG. 9. The detection units SD2L and SD2R are coupled via two coupling beams CB1 (see FIG. 25) in such a way that they can move only in antiphase in the S2 direction. This is the movement which is carried out in the case of a rotation rate about the S1 axis. If linear accelerations occur in the S2 direction, they are blocked by the beam which is suspended in a rotational fashion.

Figure 26:
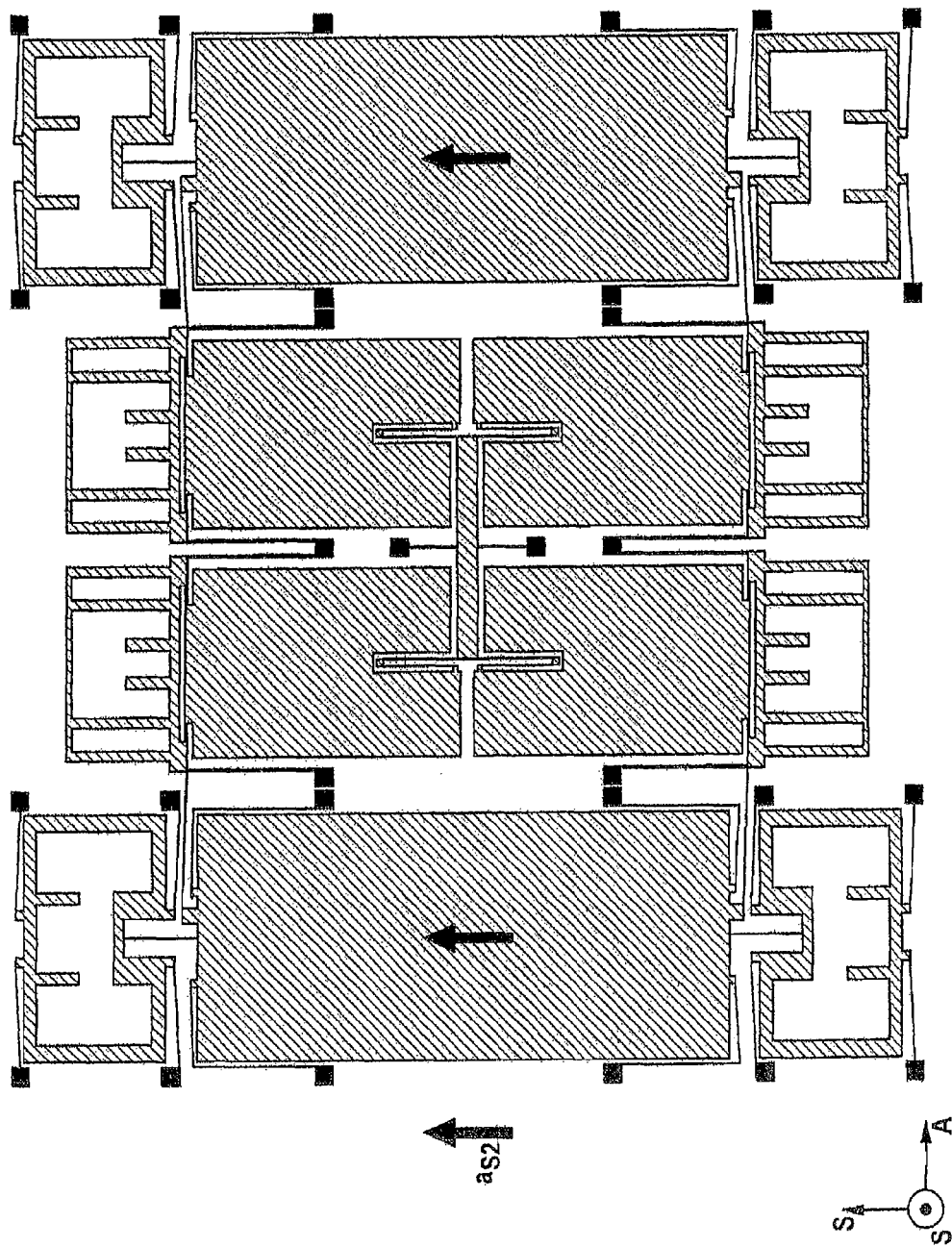
FIG. 26 depicts the reaction of the rotation rate sensor without a coupling beam to a linear acceleration aS2 in the S2 direction.
Figure 28:
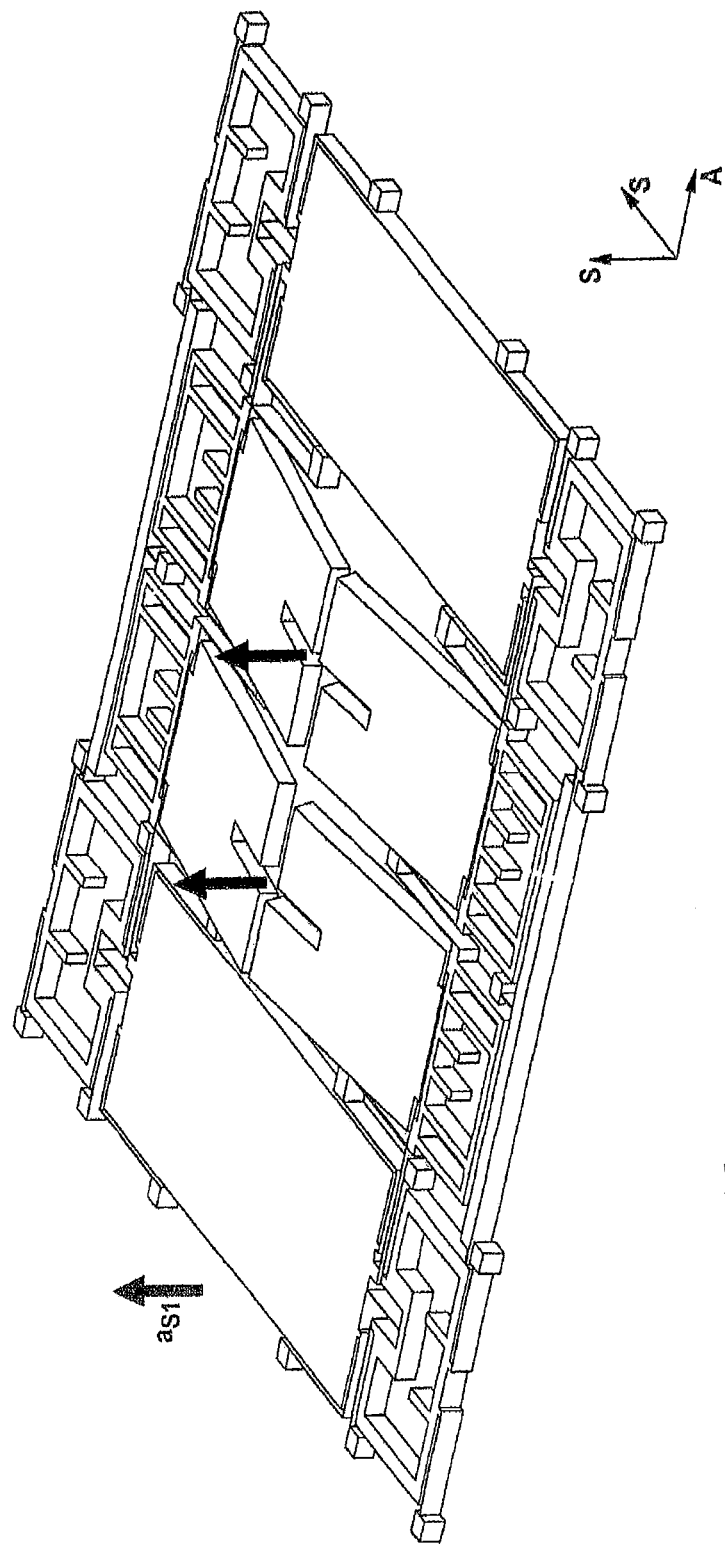
FIG. 28 depicts the reaction of the rotation rate sensor without a coupling beam to a linear acceleration aSi in the S1 direction.

FIG. 26 illustrates, by way of example, the reaction of the rotation rate sensor without a coupling beam to a linear acceleration aS2 in the S2 direction. The detection units SD1L and SD1R are coupled via the coupling beam CB2 (see FIG. 27) in such a way that they can only move in antiphase in the S1 direction. This is the movement which is carried out in the case of a rotation rate about the S2 axis. If linear accelerations occur in the S1 direction, they are blocked by the beam which is suspended in a rotational fashion. FIG. 28 illustrates by way of example the reaction of the rotation rate sensor without a coupling beam to a linear acceleration aS1 in the S1 direction.

Owing to process fluctuations, asymmetries may occur in the geometry of the rotation rate sensor. In particular, cross-coupling can arise between the drive oscillator and the detection oscillator, with the result that the driving movement directly excites the detection oscillator to undergo parasitic oscillation. While the phase of detection oscillation is brought about by a Coriolis force as a result of the speed of the driving oscillation, the phase of the parasitic oscillation results from the local function of the drive oscillator. This oscillation of the reading out oscillator is therefore phase-shifted through 90° compared to an oscillation which is generated by Coriolis force, and is also referred to as a quadrature signal. This parasitic signal can disrupt the rotational rate measurement, for which reason devices such as an exemplary quadrature trimming actuator unit are advantageous for suppressing this oscillation. There is the possibility of compensating the quadrature movement by applying electrical voltages to this quadrature trimming actuator unit.

Figure 29:
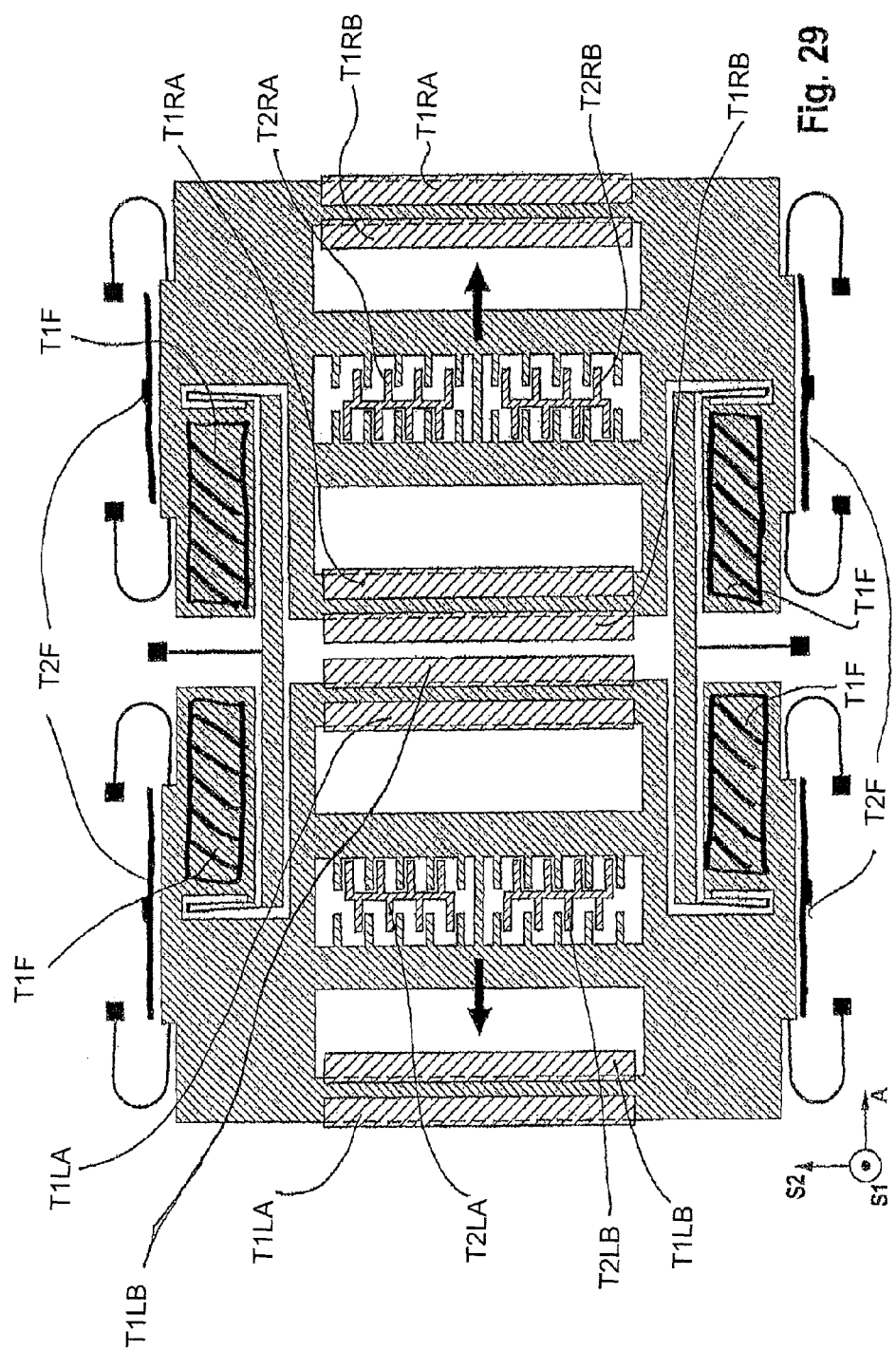
FIG. 29 shows, for the sensor from FIG. 14, the application of this compensation device, that is to say of a quadrature trimming actuator unit with electrode structures (T1LA, T1RB, T1LB, T1RA).

For the case of the quadrature movement during the measurement of a rotational rate about S1, comb structures can preferably be used, wherein the free combs are connected to the movable structure, and the opposing combs are secured to the substrate. FIG. 29 shows, for the sensor from FIG. 14, the application of this compensation device or of such a quadrature trimming actuator unit to specific quadrature trimming comb structures (T2LA, T2RB, T2LB, T2RA). These comb structures can be mounted on any rotation rate sensor which is coupled as desired. It is important here that the movable part of the comb structures is rigidly connected to the seismic mass in the driving direction. If different voltages are applied to the secured comb structures T2LA, T2RB, T2LB and T2RA, a quadrature movement can be suppressed. Therefore, for example a voltage ULARB is applied to the secured comb structures T2LA, T2RB, and a voltage ULBRA is applied to the secured comb structures T2LB, T2RA, while the movable structure is grounded.

For the case of the quadrature movement during the measurement of the rotation rate about S2, cover electrodes can expediently be mounted above or below the movable structure, with the result that they overlap the structure lying opposite. FIG. 29 shows, for the sensor from FIG. 14, the application of this compensation device, that is to say of a quadrature trimming actuator unit with electrode structures (T1LA, T1RB, T1LB, T1RA). These electrode structures can be mounted on any rotation rate sensor which is coupled in any desired fashion. It is important here that the part of the structure which lies opposite the electrodes is rigidly connected in a driving direction to the seismic mass. If different voltages are applied to the secured electrodes T1LA, T1RB, T1LB and T1RA, a quadrature movement can be suppressed. Therefore, for example a voltage ULARB is applied to the secured electrodes T1LA, T1RB, and a voltage ULBRA is applied to the secured electrodes T1LB, T1RA, while the movable structure is grounded.

As a result of the preferred use of specific, for example u-shaped, spring elements, the occurrence of quadrature can be greatly reduced. This spring element is particularly insensitive to a process fluctuation which leads to tilting of the cross section of a beam spring and therefore to cross-coupling between the modes. An expedient embodiment of such a specific spring element is illustrated by way of example with reference to FIGS. 14-18 relating to the suspension of the sensor structures.

The sensors can also preferably be equipped with, in particular additional, means such as, for example, resonant frequency-shifting actuator units with which the frequency of the corresponding detection oscillator can be influenced. This can be achieved, for example, by means of plate capacitors of these resonant frequency-shifting actuator units. For this purpose, the movable structures of the respective capacitor must be rigidly connected to the reading out structure in the detection direction. When a voltage UF is applied to the secured comb structures T2F or to the secured electrode structures T1F of the respective resonant frequency-shifting actuator units, see in each case FIG. 29, a reduction occurs in the value of the frequency fS1 or fS2 which is a function $U_F^2$.

This can be appropriate in systems which are coupled in a desired fashion. It is important here that the structures relating to the shifting of the frequency are mounted, for example, in such a way that their movable parts are rigidly connected to the detection unit in the reading out direction.

Finally, there is preferably also the possibility of shifting the frequency of the driving mode by means of comb structures which comprise a resonant frequency-shifting actuator unit. For this purpose, comb structures must be mounted in the plane of the substrate and their movable parts are connected to the drive unit in such a way that the capacitance between the movable combs and the secured combs changes approximately in proportion to the driving movement. When a voltage difference is applied between the movable combs and the secured combs, the driving frequency drops.

The rotation rate signal is expediently determined by measuring the force which is required to reset the detection deflection. For this purpose, the corresponding rotation rate sensor has a resetting actuator unit.

Figure 30:
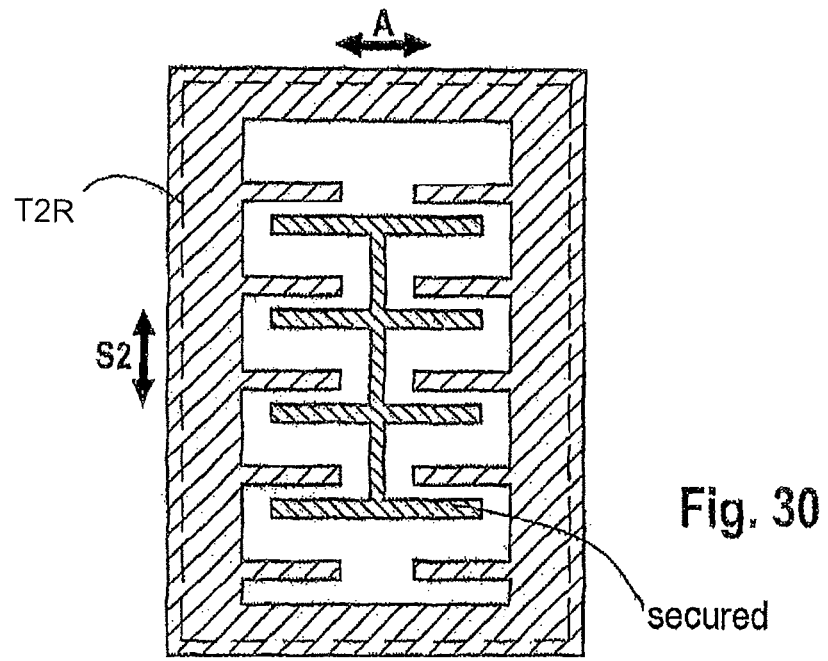
FIG. 30 shows an exemplary comb structure.

FIG. 30 shows an exemplary comb structure which can do this, that is to say a resetting comb structure, when it is rigidly connected to the reading out unit. By applying a voltage to the secured combs, a resetting force can be applied to the seismic mass which is connected to the movable combs, with the result that the detection movement is reset. The comb structures form here plate capacitors whose spacing is varied by the detection movement. The applied voltage is composed of a constant component and a chronologically variable component Uffb with the same frequency as the detection movement at the suitable phase angle. The strength of the resetting force is proportional to the product of the constant voltage component and of the amplitude of the chronologically variable component $\hat{U}_{ffb}$.

Figure 31:
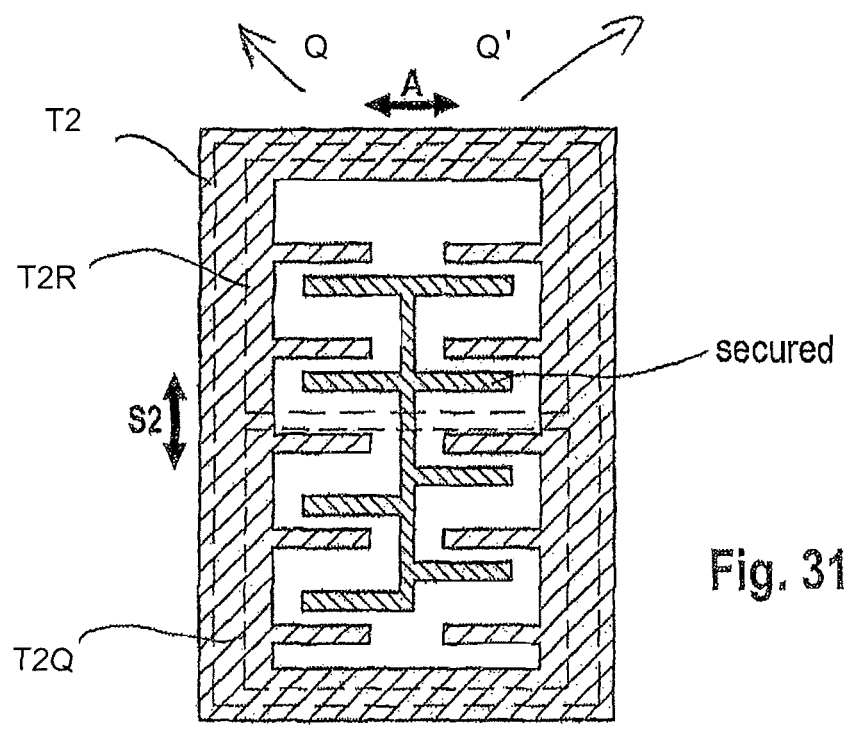
FIG. 31 shows an exemplary comb structure that can be used for quadrature compensation.

The comb structures from FIG. 30 can, for example, be modified as illustrated in FIG. 31 in such a way that they can be used at the same time for quadrature compensation, that is to say are embodied as a combined comb structure which comprises a quadrature trimming comb structure and a resetting comb structure. For this purpose, comb structures such as the devices T2LA, T2RB, T2LB and T2RA shown in FIG. 29 have to be added, with the result that the entire compensation structure is composed of a quadrature trimming comb structure T2Q for quadrature suppression and a resetting comb structure T2R for resetting the detection movement and/or resetting the reading out oscillation. Furthermore, a voltage which is composed of a constant component and a chronologically variable component with the same frequency as the detection movement is applied to the secured comb structures. However, this means that only one quadrature movement Q can be rectified. In order also to suppress possible quadrature movements Q', at least one further quadrature suppression unit must be added.

Figure 32:
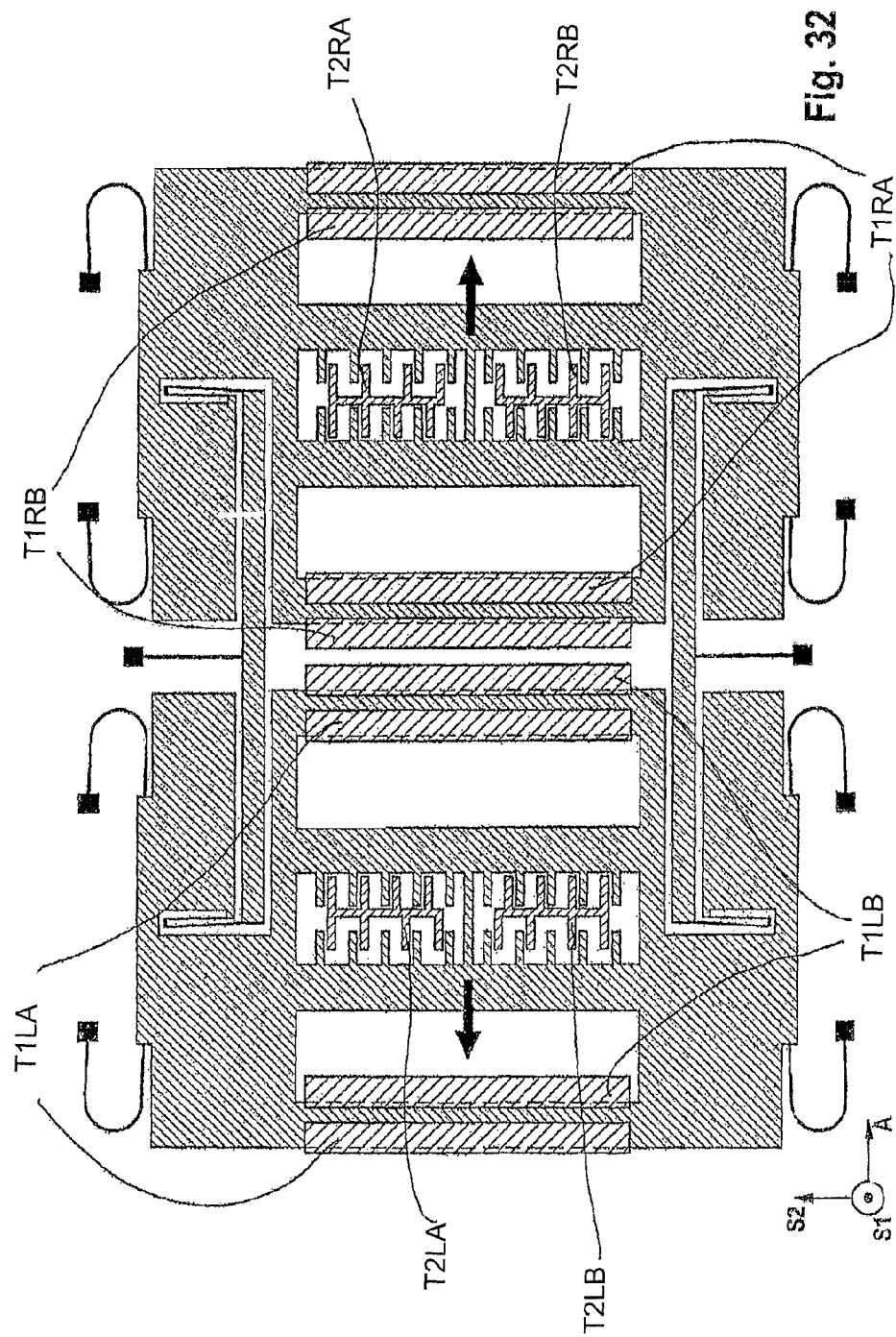
FIG. 32 illustrates the rotation rate sensor from FIG. 14 in which four combined quadrature trimming resetting actuator units for quadrature trimming and for resetting.

FIG. 32 illustrates, by way of example, the rotation rate sensor from FIG. 14 in which four combined quadrature trimming resetting actuator units for quadrature trimming and for resetting according to FIG. 31 have been provided. If, for example, a voltage ULARB+Uffb is applied to the secured comb structures T2LA, T2RB and the secured comb structures T2LB, T2RA, while the movable structure is grounded, at the same time the quadrature movement can be compensated and the detection movement reset. At the same time, the quadrature can be compensated and the rotational movement reset by means of the parameters ULARB, ULBRA and Uffb.

In order to reset a detection movement owing to a rotation about S2, additional electrodes can preferably be provided which can be configured similarly to the detection electrodes SD1L and SD1R in FIG. 14 and FIG. 24. By applying a voltage to the secured electrodes it is possible to apply a resetting force to the seismic mass lying opposite, with the result that the detection movement is reset. The applied voltage is composed of a constant component and a chronologically variable component Uffb with the same frequency as the detection movement at the suitable phase angle. The strength of the resetting force is proportional to the product of the constant voltage component and to the amplitude of the chronologically variable component $\hat{U}_{ffb}$.

The electrode structures T1LA, T1RB, T1LB and T1RA in FIG. 32 can be used not only for quadrature compensation but also for resetting a detection movement in the S1 direction. For this purpose, for example the voltages ULARB+Uffb, ULBRA+Uffb, ULARB−Uffb and ULBRA−Uffb can be applied to the secured electrodes T1LA, T1LB, T1RA and T1RB, while the movable structure is grounded. At the same time, the quadrature can be compensated and the rotational movement reset using the parameters ULARB, ULBRA and Uffb.

The rotation rate sensor is expediently manufactured by means of micromechanical fabrication methods. These comprise, inter alia, silicon dry etching, wet-chemical silicon etching, grinding and polishing, thin film deposition of metals and insulating layers, patterning of thin layers by means of photolithographic processes and reactive ion etching or wet-chemical etching and wafer bonding. These fabrication methods allow cost-effective sensor elements to be manufactured from a planar silicon substrate (wafer).

Figure 33:
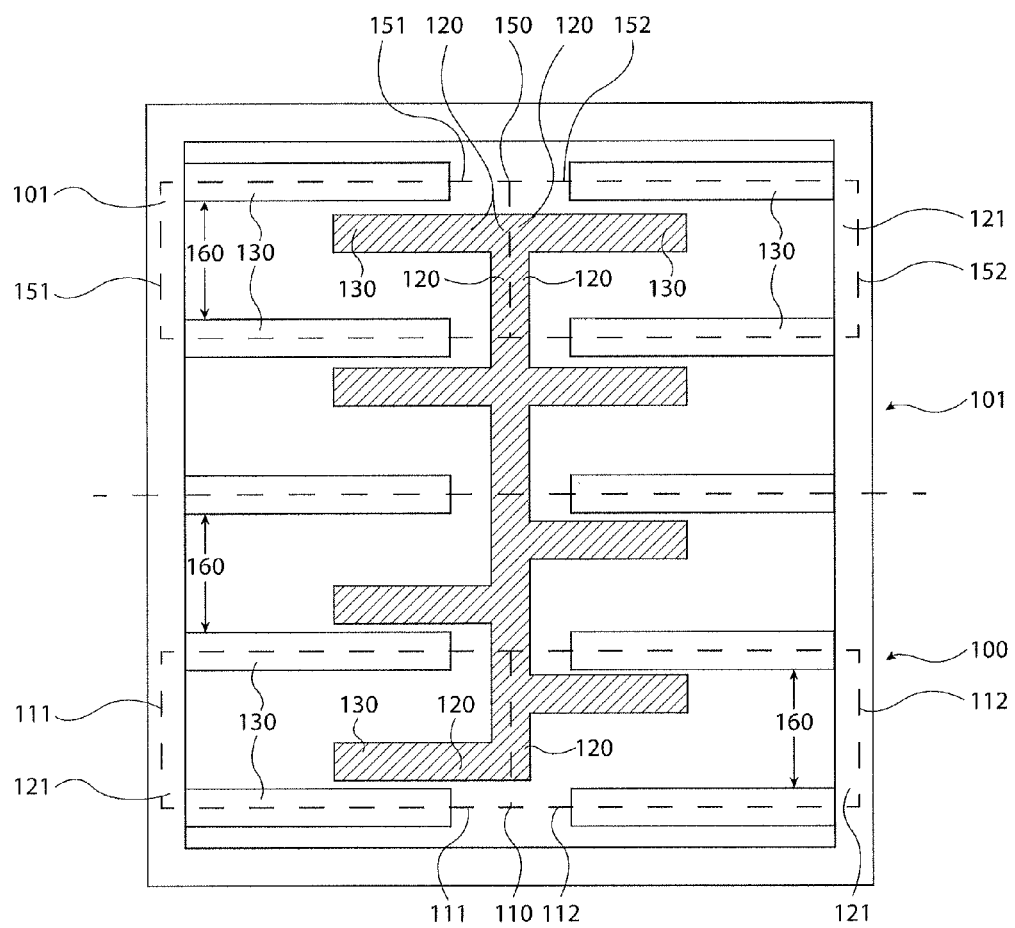
FIG. 33 depicts a combined comb structure of a combined quadrature trimming resetting actuator unit.

The combined comb structure of a combined quadrature trimming resetting actuator unit is additionally illustrated once more in FIG. 33. Said unit comprises a quadrature trimming comb structure 100 and a resetting comb structure 101. The geometry of the quadrature trimming comb structure is defined as follows: at least one comb structure base element pair 110 which is composed at least of a first 111 and a second comb structure base element 112, which each comprise a first 120 and a second comb back 121 and prongs 130 which are each integrally connected thereto, wherein the prongs of these first and second comb backs engage one in the other in a contactless, alternating fashion, wherein the second comb structure base element 112 is essentially embodied and arranged in comparison with the first comb structure base element 111 in such a way that, with respect to the geometric consideration starting from the first comb structure base element 111, said second comb structure base element 112 is rotated through 180° with respect to a normal to the surface of the substrate, and in particular is shifted in a translatory fashion within the plane of the substrate. The geometry of the resetting comb structure 101 is defined as follows: this resetting comb structure 101 comprises a comb structure base element pair 150 which is composed at least of a first 151 and a second comb structure base element 152, which each comprise a first 120 and a second comb back 121 and prongs 130 which are each integrally connected thereto, wherein the prongs of these first and second comb backs engage one in the other in a contactless, alternating fashion, wherein the second comb structure base element 152 is essentially embodied and arranged in comparison with the first comb structure base element 151 in such a way that, with respect to the geometric consideration starting from the first comb structure base element, this second comb structure base element is mirrored along a straight line, parallel to at least one of the first 120 or second comb backs 121, and is, in particular, shifted in a translatory fashion within the plane of the substrate.

The entire combined comb structure from FIG. 33 has here a common, integral first comb back 120 which has prongs 130 projecting on both sides. The second comb back 121 is also embodied in an integral, joint fashion and is embodied here as a frame which comprises prongs 130 which project inward in relation to two sides lying opposite. With respect to a state of rest or an undeflected state, the prongs 130 of the first comb back 120 do not engage centrally here, with respect to the adjacent prongs of a prong gap 160 of the second comb back 121, in the respective prong gaps 160. The first common comb back 120 is rigidly connected to the substrate and to a common electrical potential. The second common comb back 121, embodied as a frame, with its prongs 130 is rigidly connected to a seismic mass and also to a common electrical potential. The first and second common comb backs 120, 121 are correspondingly connected in an electrically conductive fashion to a quadrature trimming resetting control unit (not illustrated here), which sets or adjusts the electrical voltage between these two comb backs 120, 121 and the prongs 130 thereof in such a way that both a quadrature signal can be suppressed and a reading out oscillation or reading out deflection of the seismic mass can at the same time be reset, together with this combined comb structure.

The invention claimed is:

1. A micromechanical rotation rate sensor, comprising at least one substrate, wherein the rotation rate sensor has at least a first and a second seismic mass which are coupled to one another by at least one coupling beam, and wherein the rotation rate sensor is embodied in such a way that it can detect rotation rates about at least a first and a second sensitive axis, wherein each seismic mass is assigned at least one actuator unit with which the deflection behavior of the seismic mass can be influenced, wherein the rotation rate sensor respectively comprises at least a first, a second and a third oscillator configuration with respect to the deflection of the first and second seismic masses, wherein the first oscillator configuration has at least one drive unit which imposes a driving oscillation on said first oscillator configuration, which driving oscillation comprises deflections of the seismic mass in the direction of a first axis, wherein the first oscillator configuration has a defined driving resonant frequency, and the second oscillator configuration is defined essentially by the deflections of the seismic mass in the direction of a second axis in the form of a first reading out oscillation, which oscillation is caused by the effect and/or detection of a rotational rate about the first sensitive axis, wherein the second oscillator configuration has a defined first reading out resonant frequency, the third oscillator configuration is defined essentially by the deflection of the seismic mass in the direction of a third axis in the form of a second reading out oscillation which is caused by the effect and/or detection of a rotation rate about the first second sensitive axis, wherein the third oscillator configuration has a defined second reading out resonant frequency, wherein the at least one coupling beam is embodied and arranged in such a way that it couples the deflections of the first and second seismic masses with respect to the first reading out oscillation within the second oscillator configuration, and the rotation rate sensor additionally has at least a second coupling beam, which is embodied and arranged in such a way that it couples the deflections of third and fourth seismic masses with respect to the second reading out oscillation within the third oscillator configuration.

2. The rotation rate sensor as claimed in claim 1, wherein the at least one actuator unit has an electrode structure or a comb structure which is configured and can be actuated in such a way that an electrical actuator voltage is present between the electrode structure or comb structure of the actuator unit and the seismic mass assigned thereto, which actuator voltage gives rise to an electrical force with which the deflection behavior of the seismic mass can be influenced, and wherein said rotation rate sensor has at least one actuator unit which is embodied as a combined quadrature trimming resetting actuator unit, and the rotation rate sensor has a quadrature trimming resetting control unit which sets at least one electrical actuator voltage in such a way that the reading out deflections and/or reading out oscillations are reset with respect to the first and/or second sensitive axes of the rotation rate sensor, and that parasitic oscillation components of at least the first and second seismic masses and/or a quadrature signal are suppressed.

3. The rotation rate sensor as claimed in claim 2, wherein at least one quadrature trimming actuator unit has at least one comb structure which is embodied as a quadrature trimming comb structure and which comprises at least one comb structure base element pair which is composed at least of a first and a second comb structure base element which each comprise a first and a second comb back and comprise one or two or more prongs which are each integrally connected thereto, wherein the prongs of these first and second comb backs engage one in the other in a contactless fashion, wherein the second comb structure base element is essentially embodied and arranged in comparison with the first comb structure base element in such a way that, with respect to the geometric consideration starting from the first comb structure base element, said second comb structure base element is rotated through 180° with respect to a normal to the surface of the substrate and is shifted in a translatory fashion within the plane of the substrate.

4. The rotation rate sensor as claimed in claim 2, wherein at least one combined quadrature trimming resetting actuator unit comprises a combined comb structure which comprises a quadrature trimming comb structure, which comprises at least one comb structure base element pair which is composed at least of a first and a second comb structure base element which each comprise a first and a second comb back and one or two or more prongs which are each integrally connected thereto, wherein the prongs of these first and second comb backs engage one in the other in a contactless fashion, wherein the second comb structure base element is essentially embodied and arranged in comparison with the first comb structure base element in such a way that, with respect to the geometric consideration starting from the first comb structure base element, said second comb structure base element is rotated through 180° with respect to a normal to the surface of the substrate, and is shifted in a translatory fashion within the plane of the substrate, wherein the combined comb structure additionally has a comb structure which is configured as a resetting comb structure, wherein this resetting comb structure comprises a comb structure base element pair which is composed at least of a first and a second comb structure base element, which each comprise a first and a second comb back and one or two or more prongs which are each integrally connected thereto, wherein the prongs of these first and second comb backs engage one in the other in a contactless fashion, wherein the second comb structure base element is essentially embodied and arranged in comparison with the first comb structure base element in such a way that, with respect to the geometric consideration starting from the first comb structure base element, this second comb structure base element is mirrored along a straight line, parallel to at least one of the first or second comb backs, and is shifted in a translatory fashion within the plane of the substrate.

5. The rotation rate sensor as claimed in claim 1, wherein the rotation rate sensor has at least one actuator unit which is embodied as a quadrature trimming actuator unit, and the rotation rate sensor has a quadrature trimming control unit which sets at least one electrical actuator voltage in such a way that parasitic oscillation components of at least the first and the second seismic masses and/or a quadrature signal are suppressed.

6. The rotation rate sensor as claimed in claim 1, wherein said rotation rate sensor has at least one actuator unit which is embodied as a resetting actuator unit, and the rotation rate sensor has a resetting control unit which sets at least one electrical actuator voltage in such a way that the reading out deflections and/or reading out oscillations are reset, with respect to the first and/or second sensitive axes.

7. The rotation rate sensor as claimed in claim 1, wherein said rotation rate sensor has at least one actuator unit which is embodied as a resonant frequency shift actuator unit, and the rotation rate sensor has a resonant frequency shift control unit which sets at least one electrical actuator voltage in such a way that the driving resonant frequency and/or the first reading out resonant frequency and/or the two resonant frequencies, of the corresponding oscillator configuration or configurations are changed by a defined value and/or are set to a defined value.

8. The rotation rate sensor as claimed in claim 1, wherein the second and third oscillator configurations are embodied and/or operated in such a way that the difference between the first reading out resonant frequency and the driving resonant frequency and the difference between the second reading out resonant frequency and the driving resonant frequency are both greater than zero or are both smaller than zero, wherein, the absolute value of the difference between the first reading out resonant frequency and the second reading out resonant frequency is greater than 0.1 Hz.

9. The rotation rate sensor as claimed in 1, wherein the second and third oscillator configurations are embodied and/or operated in such a way that the difference between the first reading out resonant frequency and the driving resonant frequency is greater than zero and the difference between the second reading out resonant frequency and the driving resonant frequency is smaller than zero, or vice versa, wherein, the absolute value of the difference between the first reading out resonant frequency and the second reading out resonant frequency is greater than 0.1 Hz.

10. The rotation rate sensor as claimed in claim 1, wherein the second and third oscillator configurations are embodied and/or operated in such a way that the difference between the first reading out resonant frequency and the driving resonant frequency is essentially equal to zero or the difference between the second reading out resonant frequency and the driving resonant frequency is essentially equal to zero, or that the difference between the first reading out resonant frequency and the driving resonant frequency and the difference between the second reading out resonant frequency and the driving resonant frequency are respectively essentially equal to zero.

11. The rotation rate sensor as claimed in claim 1, wherein said rotation rate sensor comprises at least one drive unit and at least a first and a second detection unit with respect to at least the first seismic mass, wherein this drive unit and/or the first and/or the second detection units are/is connected to the seismic mass via at least one spring element.

12. The rotation rate sensor as claimed in claim 11, wherein the drive unit and/or the first and/or the second detection units are part of the seismic mass with respect to the first and/or second and/or third oscillator configurations.

13. The rotation rate sensor as claimed in claim 1, wherein the first and second seismic masses each have at least a first rotation-rate-sensitive component mass which is connected, by at least one spring element, to at least one other component unit of the respective seismic mass, wherein this first rotation-rate-sensitive component mass is embodied and configured in such a way that it is part either of the second or of the third oscillator configuration.

* * * * *